US008233815B2

(12) United States Patent
Inenaga et al.

(10) Patent No.: US 8,233,815 B2
(45) Date of Patent: Jul. 31, 2012

(54) IMAGE FORMING APPARATUS RESERVING A PLURALITY OF JOBS

(75) Inventors: Yoriko Inenaga, Hino (JP); Shigeo Konuma, Hachioji (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 417 days.

(21) Appl. No.: 12/508,636

(22) Filed: Jul. 24, 2009

(65) Prior Publication Data

US 2010/0046977 A1  Feb. 25, 2010

(30) Foreign Application Priority Data

Aug. 20, 2008 (JP) .................................. 2008-211365
Aug. 25, 2008 (JP) .................................. 2008-215223
Aug. 25, 2008 (JP) .................................. 2008-215236

(51) Int. Cl.
  *G03G 15/00* (2006.01)
(52) U.S. Cl. ............ 399/81; 399/82; 715/700; 715/764; 715/772
(58) Field of Classification Search ............ 399/81, 399/82; 715/700, 764, 772
See application file for complete search history.

(56) References Cited

U.S. PATENT DOCUMENTS

| 4,627,715 | A | | 12/1986 | Kikuno |
| 5,061,958 | A | * | 10/1991 | Bunker et al. ................. 399/81 |
| 5,096,180 | A | | 3/1992 | Nagaoka et al. |
| 2002/0135792 | A1 | | 9/2002 | Sommer et al. |
| 2004/0156069 | A1 | | 8/2004 | Kurotsu et al. |
| 2004/0218197 | A1 | | 11/2004 | Vliembergen et al. |
| 2008/0246989 | A1 | * | 10/2008 | Konuma ....................... 358/1.15 |
| 2008/0250353 | A1 | * | 10/2008 | Konuma ....................... 715/840 |
| 2010/0034550 | A1 | * | 2/2010 | Arai et al. ....................... 399/81 |
| 2010/0296830 | A1 | * | 11/2010 | Kamata ........................... 399/81 |
| 2011/0052241 | A1 | * | 3/2011 | Kurohata ....................... 399/81 |
| 2011/0083095 | A1 | * | 4/2011 | Konuma ....................... 715/772 |

FOREIGN PATENT DOCUMENTS

| EP | 1 056 030 | 11/2000 |
| GB | 2 297 009 | 7/1996 |
| JP | 2003-256182 | 9/2003 |
| JP | 2004-348713 A | 12/2004 |

OTHER PUBLICATIONS

European Search Report issued in corresponding Application No. 09165555.5-2202 dated Oct. 22, 2009.
Official Action issued by the Chinese Patent Office on Dec. 29, 2011 in corresponding Chinese Patent Application No. 200910168247.3, and an English translation of the Official Action.

* cited by examiner

*Primary Examiner* — Ryan Walsh
(74) *Attorney, Agent, or Firm* — Buchanan Ingersoll & Rooney PC

(57) ABSTRACT

Disclosed is an image forming apparatus comprising a control section to display a job scheduling screen in a display section and a storage section to store tray-paper information relating to a paper of each of trays, and the control section specifies a tray or a paper to be used in each of the jobs and displays the reservation information for a length corresponding to the number of sheets of paper planed to be used in each of the jobs in the second axis at a position on the first axis corresponding to the tray or the paper which is specified and the control section determines whether a job having a stopping cause which stops at least a part of the image forming process is reserved or not, and the control section displays job information relating to the job having the stopping cause in the job scheduling screen when determining that the job having the stopping cause is reserved.

20 Claims, 15 Drawing Sheets

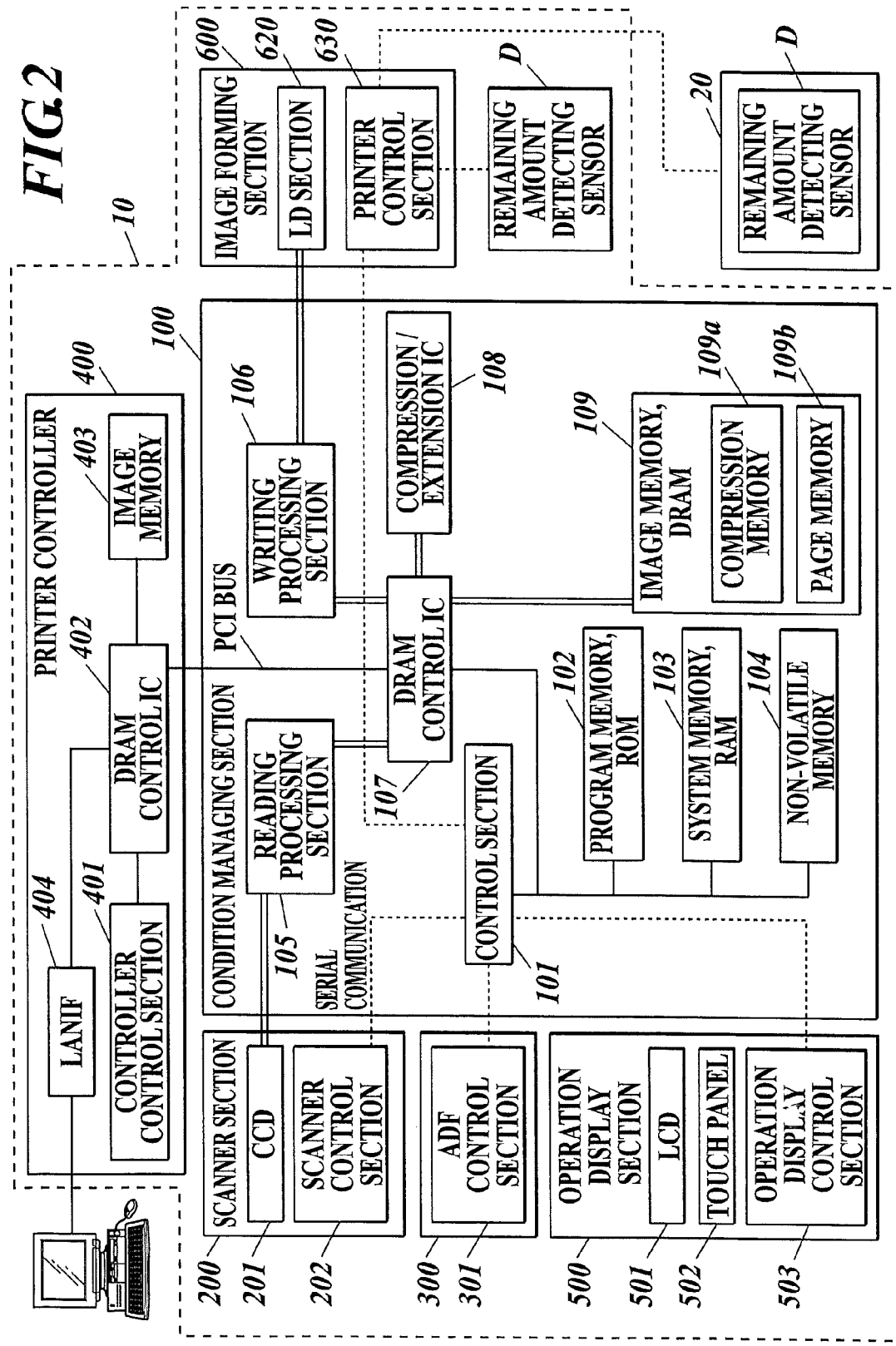

| TRAY | PAPER TYPE | PAPER SIZE | BASIS WEIGHT [g/m²] | REMAINING AMOUNT OF PAPER [SHEETS] |
|---|---|---|---|---|
| PAPER FEEDING TRAY TF1 | REGULAR PAPER | A4 | 62-71 | 1700 |
| PAPER FEEDING TRAY TF2 | HIGH QUALITY PAPER | A3 | 50-61 | 130 |
| PAPER FEEDING TRAY TF3 | XX SPECIAL PAPER | A4 | 62-71 | 500 |
| PAPER FEEDING TRAY TF4 | HIGH QUALITY PAPER | A3 | 50-61 | 1000 |
| PAPER FEEDING TRAY TF5 | REGULAR PAPER | A4 | 50-61 | 600 |
| PAPER FEEDING TRAY TF6 | REGULAR PAPER | A4 | 62-71 | 1200 |
| PAPER FEEDING TRAY TF7 | REGULAR PAPER | A4 | 50-61 | 0 |
| PAPER FEEDING TRAY TF8 | REGULAR PAPER | A4 | 62-71 | 400 |
| PAPER FEEDING TRAY TF9 | REGULAR PAPER | A4 | 62-71 | 800 |
| POST INSERTER PI1 | REGULAR PAPER | A4 | 62-71 | — |
| POST INSERTER PI2 | REGULAR PAPER | A4 | 62-71 | — |

IMAGE FORMING APPARATUS RESERVING A PLURALITY OF JOBS

BACKGROUND OF THE INVENTION

1. Field of the Invention

The present invention relates to an image forming apparatus which can reserve a plurality of jobs.

2. Description of Related Art

In image forming apparatuses such as a printer, a copier, a scanner or a multi functional printer of them, an image forming process is executed according to an image process request called a job. Conventionally, the image forming apparatus which can reserve a plurality of jobs and which executes the plurality of reserved jobs in order is widely used as the above image forming apparatus.

In the above described image forming apparatus, the image forming process stops when paper cannot be fed due to a cause such as insufficiency in paper or the like while the job is in execution. In such case, the image forming process remains in a stopped state until restart of the image forming process is instructed after the cause of stopping of the image forming process is removed by supplying paper, by carrying out change in setting condition of the job or the like. Therefore, when a job in which the image forming process stops is included in the reserved jobs, there are problems that utilization rate and productivity of the image forming apparatus decline.

In order to prevent the utilization rate of the image forming apparatus from declining, there is a need to know the job in which the image forming process stops and to carry out processes for not allowing the image forming process to stop such as supplying the paper, changing the reserved order of execution of the job, holding the job, deleting the job, changing the setting condition of the job or the like.

In FIG. 15, a job list screen of the conventional image forming apparatus is shown.

In the job list screen of FIG. 15, setting information of a plurality of reserved jobs including the job which is in execution are displayed by a list in the reserved order of execution, and a mode (for example, printer mode, copy mode), a condition (in execution or reserved), number of sheets of paper (for example, 20 sheets), number of copies (for example, 3 copies), remaining number of sheets of paper (for example, 60 sheets), time (for example, 1 minutes), user name (for example, Yamada Tarou) and file name (for example, test file) of each of the jobs can be recognized by being corresponded to one another.

However, in the job list screen of FIG. 15, the job in which the image forming process stops cannot be known in advance. Therefore, what approach should be taken in order not to stop the image forming process cannot be determined and there is a problem that an appropriate approach for not stopping the image forming process is difficult to be carried out.

In view of the above problem, there is suggested a printing system which displays a matrix in which the vertical axis indicates paper type and the horizontal axis indicates a scheduled job on a screen in a schedule mode (for example, see JP2004-348713). In the screen, what type of paper is to be used in each of the reserved jobs can be recognized, and also, the time when the paper becomes insufficient can be confirmed.

In JP2004-348713, the job in which the paper becomes insufficient and the times when papers of each type become insufficient can be recognized on the screen. However, detail of the job in which the image forming process stops cannot be known by only looking at the screen. Therefore, even the image forming apparatus of JP2004-348713 cannot determine how to approach the job in which the image forming process stops and a prompt approach according to each of the jobs cannot be carried out. Therefore, the image forming apparatus cannot be operated efficiently.

SUMMARY OF THE INVENTION

An object of the present invention is to provide an image forming apparatus in which a plurality of jobs can be reserved and which can be operated efficiently.

In particular, an object is to make an appropriate approach for not stopping the image forming process according to each of the jobs so as to be easy to be carried out by making the detail of the job in which at least a part of the image forming process cannot be carried out be recognizable. Further, another object is to efficiently carry out the execution change operation of the job for not stopping the image forming process. Furthermore, another object is to make whether the setting change of tray is necessary or not be recognized at glance by displaying the trays, tray information of each tray and the plurality of reserved jobs so as to be corresponded to one another.

According to a first aspect of the present invention, there is provided an image forming apparatus comprising a reservation section to reserve a plurality of jobs, an image forming section to execute an image forming process according to the jobs reserved by the reservation section, a control section to display a job scheduling screen in a display section, the job scheduling screen having reservation information of each of the jobs which are reserved displayed in a two dimensional chart in which a first axis indicates tray information or paper information and in which a second axis indicates the number of sheets of paper planed to be used or an estimated execution time and a storage section to store tray-paper information relating to a paper of each of trays, and the control section specifies a tray or a paper to be used in each of the jobs based on a setting condition of each of the jobs which are reserved and displays the reservation information for a length corresponding to the number of sheets of paper planed to be used in each of the jobs in the second axis at a position on the first axis corresponding to the tray or the paper which is specified and the control section determines whether a job having a stopping cause which stops at least a part of the image forming process is reserved or not based on a setting condition and the tray-paper information of each of the jobs which are reserved, and the control section displays job information relating to the job having the stopping cause in the job scheduling screen when determining that the job having the stopping cause is reserved.

According to a second aspect of the present invention, there is provided an image forming apparatus comprising a reservation section to reserve a plurality of jobs, an image forming section to execute an image forming process according to the jobs reserved by the reservation section, a control section to display a job scheduling screen in a display section, the job scheduling screen having reservation information of each of the job which are reserved displayed in a two dimensional chart in which a first axis indicates tray information or paper information and in which a second axis indicates the number of sheets of paper planed to be used or an estimated execution time and an operation section to carry out an execution change operation of a job on the job scheduling screen, and the control section specifies a tray or a paper to be used in each of the jobs based on a setting condition of each of the jobs which are reserved and displays the reservation information for a length corresponding to the number of sheets of paper planed to be used in each of the jobs in the second axis at a position on the first axis corresponding to the tray or the paper which is specified and the control section carries out an execution change process corresponding to the execution change operation carried out by the operation section.

According to a third aspect of the present invention, there is provided an image forming apparatus comprising a reservation section to reserve a plurality of jobs, an image forming section to execute an image forming process according to the jobs reserved by the reservation section, a plurality of paper feeding trays, a control section to display a job scheduling screen in a display section, the job scheduling screen having reservation information of each of the jobs which are reserved displayed in a two dimensional chart in which a first axis indicates tray information for each of the paper feeding trays and in which a second axis indicates an estimated execution time or the number of sheets of paper planed to be used of a job, a first operation section to give an instruction to display a setting change screen for changing a setting of the tray information in a state where the job scheduling screen is displayed in the display section and a second operation section to give an instruction to change a setting of the tray information in the setting change screen, and the control section specifies a paper feeding tray to be used in each of the jobs based on the setting information of each of the jobs which are reserved, displays the reservation information at a position on the first axis corresponding to the specified paper feeding tray and on the second axis for a length corresponding to the estimated execution time or the number of sheets of paper planed to be used of each of the jobs, displays the setting change screen in the display section when the first operation section is operated and carries out a setting change of the tray information when the setting change of the tray information is instructed by the second operation section.

BRIEF DESCRIPTION OF THE DRAWINGS

The above and other objects, advantages and features of the present invention will become more fully understood from the detailed description given hereinbelow and the appended drawings which are given by way of illustration only, and thus are not intended as a definition of the limits of the present invention, and wherein:

FIG. 2 is a block diagram showing a functional structure of the image forming apparatus;

FIG. 3 is an example of a tray information table which stores tray-paper information;

FIG. 6 is a diagram exemplifying a job scheduling screen to be displayed when the reservation information of the job which is second in a reserved order of execution is selected in the job scheduling screen of FIG. 4;

FIG. 7 is a diagram exemplifying a job scheduling screen to be displayed when the reservation information of the job which is fourth in the reserved order of execution is selected in the job scheduling screen of FIG. 4;

FIG. 8 is a diagram exemplifying a job scheduling screen to be displayed when the reservation information of the job which is third in the reserved order of execution is selected in the job scheduling screen of FIG. 4;

FIG. 9 is a diagram exemplifying an job scheduling screen to be displayed when the reservation information of the job which is sixth in the reserved order of execution is selected in the job scheduling screen of FIG. 4;

FIG. 10 is a diagram exemplifying a job scheduling screen in which job information of a job having a stopping cause is displayed;

FIG. 11 is a diagram exemplifying a job scheduling screen in which a setting change screen is displayed;

Figure 15:
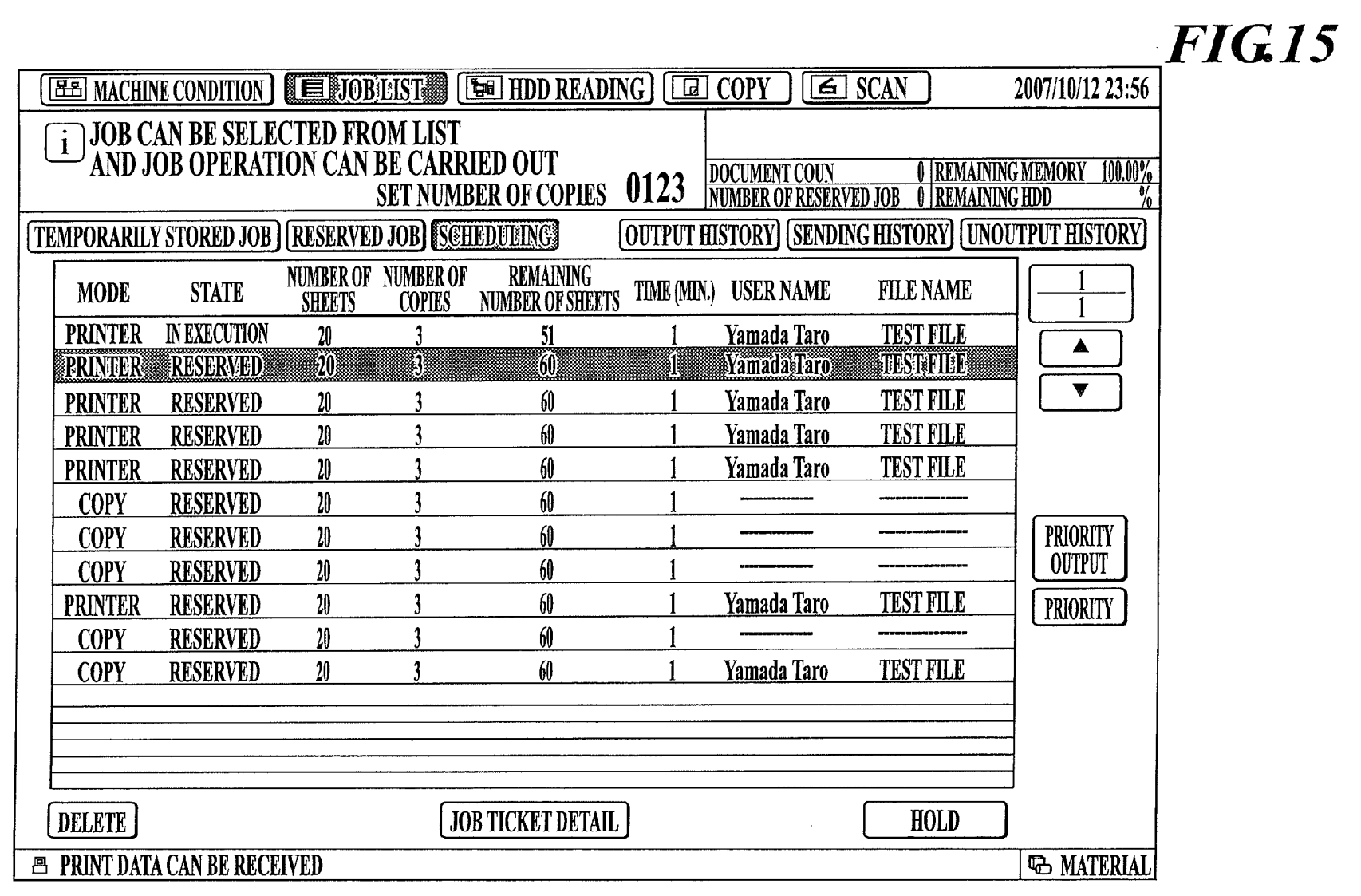

FIG. 15 is an example of a job list screen of a conventional image forming apparatus.

DESCRIPTION OF THE PREFERRED EMBODIMENTS

Figure 1:
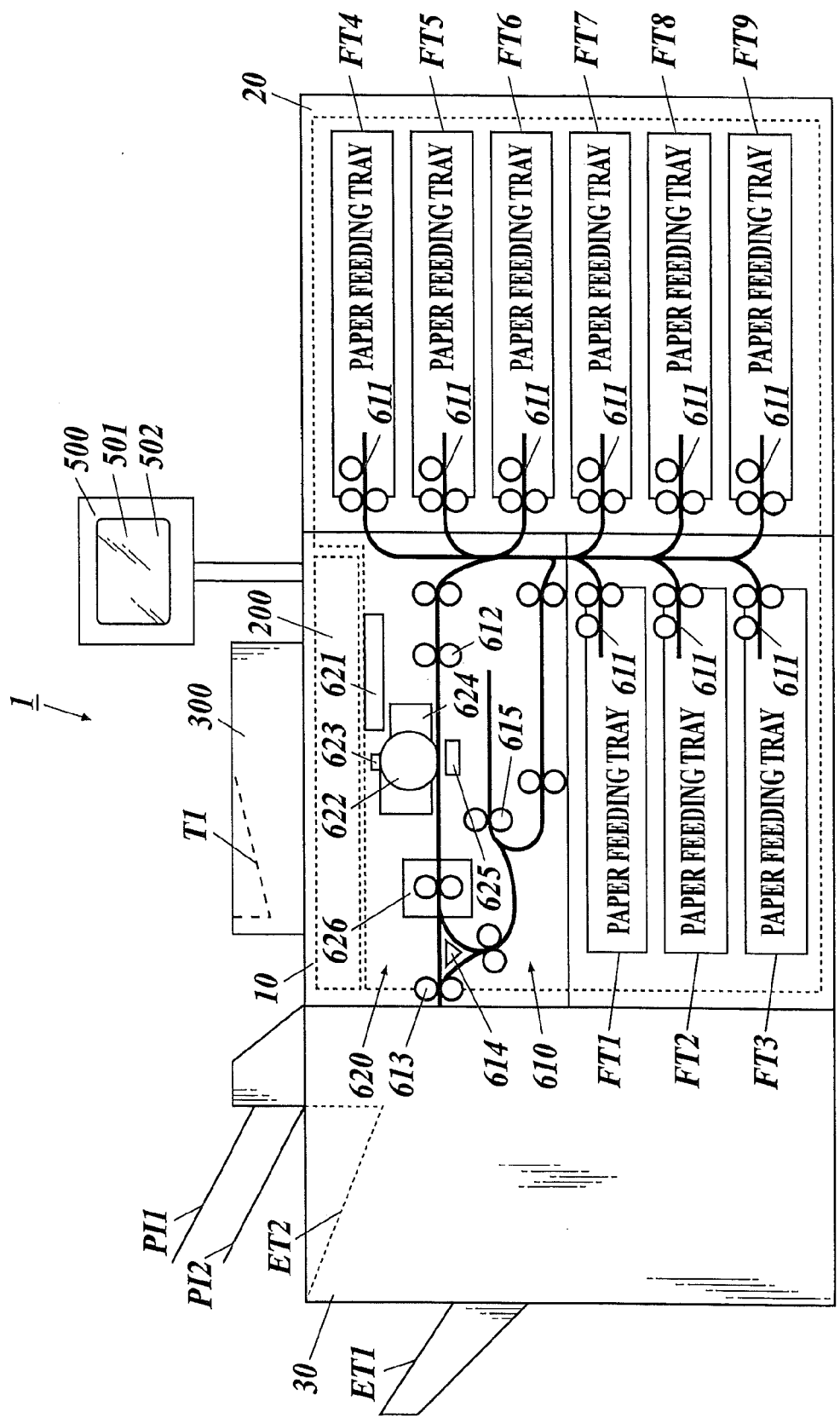
FIG. 1 is a front view showing a schematic structure of an image forming apparatus of the embodiment.

Hereinafter, an embodiment of an image forming apparatus according to the present invention will be described with reference to the drawings. However, the scope of the invention is not limited to the examples shown in the drawings.

FIG. 1 is a front view showing a schematic structure of the image forming apparatus 1 of the embodiment.

As shown in FIG. 1, the image forming apparatus 1 according to the embodiment comprises a main body 10, a large capacity tray unit 20 and an after processing section 30, the large capacity tray unit 20 and the after processing section 30 being optionally connected to the main body 10.

The main body 10 comprises a scanner section 200, an automatic document feeding section (ADF: Auto Document Feeder) 300, an operation display section 500 and an image forming section 600. That is, the image forming apparatus 1 according to the embodiment is a so called digital multi function printer comprising a scanner function, a copy function and a printer function.

Further, for example, the main body 10 comprises three paper feeding trays FT1 to FT3 which are trays for printing papers, and the printing papers are stored therein. The remaining amount detection sensors D as remaining amount detection section to detect the remaining amount of the paper stored in each of the paper feeding trays FT1 to FT3 are provided near by each of the paper feeding trays FT1 to FT3.

For example, the larger capacity tray unit 20 comprises paper feeding trays FT4 to FT9 which are trays for printing papers, and the printing papers are stored therein. The remaining amount detection sensors D as remaining amount detection section to detect the remaining amount of paper stored in each of the paper feeding trays FT4 to FT9 are provided near by each of the paper feeding trays FT4 to FT9.

The after processing section 30 is a so-called finisher which carries out various types of after processings to a paper conveyed from the main body 10. For example, the after processing section 30 comprises a sort unit to carry out sort process of papers conveyed from the main body 10, a punch unit to carry out punching process, a folding unit to carry out folding process, a cutting unit to carry out cutting process and the like. At the left side of the after processing section 30, paper ejection trays ET1 and ET2 for ejecting the conveyed papers are provided, and the papers which are conveyed are ejected.

Further, at the upper part of the after processing section 30, two post inserters an upper stand PI1 and a lower stand PI2 which are trays for inserting papers are provided, and various types of papers can be loaded and fed according to the needs of a user.

For example, by loading tab papers having projected tab portion at a portion of the papers, color sheets in different colors, paper in which an image is already formed and the like (hereinafter, called tab papers and the like) on either of the post inserters PI1 and PI2 and by feeding the papers according to setting of the job, these papers can be inserted between a plurality of printing papers which are conveyed from the main body 10.

In the image forming process, for example, a document placed on the document tray T1 of the ADF section 300 is conveyed to the contact glass which is the reading part of the scanner section 200 and an image of the document is read by the optical system of the scanner section 200. Here, image is not limited to image data such as diagrams, photographs and the like. Image includes text data and the like such as letters, symbols and the like.

The image (analog image signal) read by the scanner section 200 is outputted to the after-mentioned condition managing section 100 to be A/D converted and is outputted to the image forming section 600 after various types of image processes are carried out. Then, in the image forming section 600, an image based on the digital image data is formed on a paper fed from any one of the paper feeding trays FT1 to FT9 provided at the main body 10 or at the large capacity tray unit 20.

The paper in which the image is formed is conveyed to the after processing section 30 by the conveyance section 610 in the image forming section 600. Then, the paper is ejected to either of the paper ejection trays ET1 and ET2 after a predetermined after processing is carried out to the paper by the after processing mechanism of the after processing section 30.

That is, in the image forming apparatus 1 of the embodiment, paper can be fed from the paper feeding trays FT1 to FT9 and the post inserters PI1 and PI2. When paper cannot be fed from the paper feeding trays FT1 to FT9 and the post inserters PI1 and PI2, the image forming process by the image forming section 600 is to stop.

Here, in the description of the embodiment hereinafter, the above described paper feeding trays FT1 to FT9 and the post inserters PI1 and PI2 are collectively called "trays".

Further, forms of the paper feeding trays FT1 to FT9, the post inserters PI1 and PI2 and the paper ejection trays ET1 and ET2 are not limited to the examples shown in FIG. 1, and for example, the number can be larger or smaller than what is shown in the drawing.

FIG. 2 is a block diagram showing a functional structure of the image forming apparatus 1.

The main body 10 comprises the condition management section 100, the scanner section 200, the ADF section 300, the print controller 400, the paper feeding trays FT1 to FT3, the remaining amount detection sensors D, the operation display section 500 and the image forming section 600.

For example, the condition management section 100 comprises a control section 101, a program memory (ROM: Read Only Memory) 102, a system memory (RAM: Random Access Memory) 103, a non-volatile memory 104, a reading process section 105, a writing process section 106, a DRAM (Dynamic Random Access Memory) control IC 107, a compression/extension IC 108 and an image memory 109.

For example, the control section 101 comprises the CPU (Central Processing Unit) and the like. The control section 101 reads various types of process programs such as a system program, an image forming process program, an after processing process program and the like and expands the programs in the RAM. Then, the control section 101 integrally controls the operation of each part of the image forming apparatus 1 according to the expanded programs.

In particular, the control section 101 stores setting information of jobs which are reserved in the after-mentioned job reservation screen in the non-volatile memory 104. The setting information includes setting condition of the job, and the control section 101 executes the image forming process by the image forming section 600 based on the setting condition of the job stored in the non-volatile memory 104. Job indicates a series of operations related to image forming. For example, when making copies of a plurality of sheets of document, a series of operations relating to making copies of the plurality of sheets of document is one job. Further, when a plurality of copies of copying is carried out, a series of operations relating to making copies of the plurality of copies of document is one job.

Here, the image forming apparatus 1 of the embodiment can reserve a plurality of jobs, and the control section 101 executes image forming process according to the reserved jobs in the reserved order of execution of the jobs.

Further, as described later, the control section 101 executes a control to display the job scheduling screen in the display section 501, the job scheduling screen showing the reservation information R of a plurality of reserved jobs based on the setting condition of the plurality of reserved jobs.

The ROM 102 comprises the non-volatile memory 104 such as the semi-conductor and the like. The ROM 102 stores the system program which corresponds to the image forming apparatus 1 and various types of process programs such as the image forming process program, the after processing program and the like which can be executed on the system program. The programs are stored in a mode of program code which can be read by a computer, and the control section 101 sequentially executes operations according to the program code.

The RAM 103 forms a work area to temporarily store various types of programs to be executed by the control section 101 and data according to the programs, and the RAM 103 stores the setting information and the like of the job which is in execution.

The non-volatile memory 104 stores various types of setting data and the like according to the image forming apparatus 1.

In particular, the non-volatile memory 104 stores the setting information of the job which is inputted in the after-mentioned job reservation screen.

Further, the non-volatile memory 104 comprises the after-mentioned tray information table 104a as a storage section and stores tray-paper information relating to paper to be stored in each of the trays.

Moreover, the non-volatile memory 104 stores information relating to update timing of the job scheduling screen which is set by a user as described later.

The reading process section 105 carries out various types of processes such as the analog signal process, the A/D conversion process, the shading process and the like to the analog image signal inputted from the scanner section 200. Then, the reading process section 105 generates digital image data and outputs the digital image data to the DRAM control IC 107.

The writing process section 106 generates the PWM (Pulse Width Modulation) signal based on the image data to be inputted from the compression/extension IC 108 and outputs the PWM signal to the image forming section 600.

The DRAM control IC 107 controls the compression/extension process of the compression/extension IC 108 and also carries out a control of input and output of the image data to and from the image memory 109 based on the control from the control section 101.

In particular, the DRAM control IC 107 makes the digital image data inputted from the reading process section 105 or the image data inputted from the print controller 400 be compressed by the compression/extension IC 108 and writes the compressed image data in the compression memory 109a of the image memory 109 to temporarily store the image data. Further, the DRAM control IC 107 makes the image data stored in the image memory 109 be expanded by the compression/extension IC 108 and outputs the expanded image data to the writing process section 106. At this time, when a control signal indication that a synthetic process is to be carried out is outputted from the control section 101, the DRAM control IC 107 makes the compression/extension IC 108 extend the image data, and then, overwrites the specific image data in the non-volatile memory 104 and outputs the image data to the writing process section 106.

Moreover, the DRAM control IC 107 outputs the control data inputted from the print controller 400 to the control section 101.

The compression/extension IC 108 carries out the compression process and the extension process of the image data by the control of the DRAM control IC 107.

For example, the image memory 109 has the compression memory 109a and the page memory 109b which are constituted of the DRAM. The compression memory 109a temporarily stores the job file which is compressed at the compression/extension IC 108 according to the control signal to be inputted from the DRAM control IC 107, for example. The page memory 109b temporarily stores the non-compressed job file which is the object to be printout before the printout, for example.

For example, the scanner section 200 comprises an image sensor such as the CCD 201 and a scanner control section 202. The scanner control section 202 drive controls each part of the scanner section 200 based on the control signal from the control section 101. In particular, the scanner control section 202 makes the exposure scanning of the document surface placed on the contact glass be executed and reads the image by imaging the reflection light at the CCD 201. Then, the scanner control section 202 allows the analog image signal to be generated by carrying out photoelectric conversion to the optical signal by which an image is formed and outputs the analog image signal to the reading process section 105.

The ADF section 300 comprises the ADF control section 301 for carrying out control of the ADF section 300 based on the control signal from the control section 101 and the ADF section 300 automatically feeds the document placed on the document tray T1 one by one onto the contact glass of the scanner section 200.

The paper feeding trays FT1 to FT9 are trays for storing printing papers, and the trays store various types of papers, papers in various paper sizes and various papers having different basis weights.

Here, each of the paper feeding trays FT1 to FT9 and the post inserters PI1 and PI2 stores papers in which the paper type, the paper size and the basis weight are set in advance, and information relating to the paper type, the paper size and the basis weight of the paper to be stored in each of the trays is stored in the tray information table 104a as the tray-paper information along with the remaining amount of papers of each tray detected by the remaining amount detection sensors D.

In FIG. 3, the tray information table 104a in which the tray-paper information is stored is shown.

As shown in FIG. 3, the tray information table 104a stores the paper type, the paper size and the basis weight of papers to be stored in each of the trays (paper feeding trays FT1 to FT9 and post inserters PI1 to PI2) and the remaining amount of papers in each of the trays detected by the remaining amount detection sensors D as the tray-paper information. The paper to be stored in each tray will be set by the paper type, the paper size and the basis weight of paper being stored so as to be corresponded to each tray in the tray information table 104a.

In FIG. 3, for example, the paper feeding tray FT1 is set to store the paper in which paper type is "regular paper", paper size is "A4" and basis weight is "62-71 $g/m^2$" and remaining amount of paper is "1700 sheets". Further, for example, the paper feeding tray FT2 is set to store the paper in which paper type is "high quality paper", paper size is "A3" and basis weight is "50-61 $g/m^2$" and remaining amount of paper is "130 sheets".

Moreover, in the tray information table 104a of FIG. 3, each of the paper feeding trays FT1 to FT9 and the post inserters PI1 and PI2 is set to store either of "A4 size regular paper of 62-71 $g/m^2$", "A4 size regular paper of 50-61 $g/m^2$", "A3 size high quality paper of 50-61 $g/m^2$" and "A4 size XX special paper of 62-71 $g/m^2$". That is, it is set so that papers other than the above described papers cannot be used in the image forming apparatus 1.

The remaining amount detection sensors D are provided near each of the paper feeding trays FT1 to FT9, and the remaining amount detection sensors D detect remaining amount of paper stored in each of the paper feeding trays FT1 to FT9. The remaining amount of paper in each of the paper feeding trays FT1 to FT9 detected by the remaining amount detection sensor D is outputted to the control section 101 and is stored in the tray information table 104a of the non-volatile memory 104 as the tray-paper information.

The printer controller 400 comprises the controller control section 401, the DRAM control IC 402, the image memory 403, the LAN IF 404 and the like. When the image forming apparatus 1 is to be used as a network printer, the printer controller 400 carries out management and control of a job to be inputted to the image forming apparatus from an external device connected to the network.

In particular, the print controller 400 receives data including the after-mentioned setting condition of the job from the external device as the reservation section and sends the data to the main body 10. The setting condition of the job which is sent to the main body 10 from the printer controller 400 is outputted to the control section 101 along with information such as mode, user name, file name, after processing mode, paper ejection trays ET1 and ET2 and the like as the setting information of the job and will be stored in the non-volatile memory 104 along with the reserved order of execution.

The controller control section 401 integrally controls operations of each part of the print controller 400. Further, the controller control section 401 converts the print data which is inputted from the external device via the LAN IF 404 into an image data of data format which can be printed in the image forming apparatus 1 by a predetermined page description language, and outputs the image data to the DRAM control IC 402 along with the information of the job inputted from the external device.

The DRAM control IC 402 outputs the information and the print data of the job received by the LAN IF 404 to the controller control section 401. The DRAM control IC 402 also carries out a control to temporarily store the information and the image data of the job inputted from the controller control section 401 to the image memory 403 according to an instruction from the controller control section 401. Further, the DRAM control IC 402 is connected with the DRAM control IC 107 of the control section 101 by the PCI (Peripheral Components Interconnect) bus, and the information and image data of the job are read from the image memory 403 and are outputted to the DRAM control IC 402 according to an instruction from the controller control section 401.

For example, the image memory 403 is constituted with the DRAM and temporarily stores the inputted data.

For example, the LAN IF 404 is constituted with the NIC (Network Interface Card) or the like and carries out sending and receiving of data such as job information, print data and image data of Facsimile between the external device connected to the communication network N. The job information, the print data and the image data received from the external device is outputted to the DRAM control IC 402.

The operation display section 500 comprises the display section 501, the touch panel 502 integrally provided at the display section 501, the operation display control section 503 and a group of other operation keys (omitted from the drawing).

For example, the display section 501 is constitutes with the LCD (Liquid Crystal Display) and carries out a display of various types of setting screens, the display of image condition, the operating condition of each function and the like on the screen according to the display control signal from the operation display control section 503.

Moreover, a pressure sensitive (resistive film pressure type) touch panel 502 in which transparent electrodes are disposed in a lattice form is structure on the screen of the display section 501, and the XY coordinate of the stressed point operated by a finger, a touch pen or the like is detected in an electrical pressure value and the detected position signal is outputted to the operation display control section 503 as the operation signal.

The operation display control section 503 carries out a display control in the display section 501 based on the control signal from the control section 101. For example, the operation display control section 503 displays the job reservation screen for making reservation of the job, the job scheduling screen showing the after-mentioned reservation information R of the job, various types of setting screens, various types of process results and the like in the display section 501. Further, the operation display control section 503 outputs the operation signal inputted from the touch panel on the display section 501 or from a group of operation keys to the control section 101.

In particular, the touch panel 502 is operated as the reservation section when a user is making reservation of a job. The reservation of a job is carried out by setting the setting condition of the job by a user operating the touch panel 502 on the job reservation screen displayed in the display section 501.

Here, the tray setting information, the paper setting information and the number of sheets of paper planed to be used are included in the setting condition of the job. The tray setting information is information for setting the tray which is used in the job. In particular, the tray setting information is information for setting any one of or a plurality of the paper feeding trays FT1 to FT9 and the post inserters PI1 and PI2 as the tray which are used in the job. Further, the paper setting information is information for setting a paper which is used in the job. In particular, the paper setting information is information for setting the paper type, the paper size and the basis weight of the paper which is used in the job.

A user sets the tray and/or the paper which is used in the job by operating the touch panel 502 on the job reservation screen displayed in the display section 501 to set either one of or both of the tray setting information (for example, paper feeding tray FT1) and the paper setting information (for example, regular paper/A4/62-71 g/m$^2$) as the setting condition of the job. Further, when the tray setting information is not set and when only the paper setting information is set as the setting condition of the job, that is, when the paper is set without the tray being set, the tray which stores the set paper is to be automatically selected based on the after-mentioned tray information table 104a.

The setting condition of the job set by the operation of the touch panel 502 on the job reservation screen is outputted to the control section 101 via the operation display control section 503 along with other information such as mode, user name, file name, after processing mode, paper ejection trays ET1 and ET2 and the like as the setting information of the job, and the setting condition is stored in the non-volatile memory 104 along with the reserved order of execution.

Moreover, the touch panel 502 is operated when the user carries out the display request so as to display the job scheduling screen in the display section 501. In particular, a button B1 (see FIGS. 4 to 10) for requesting so as to display the job scheduling screen is displayed in the display section 501, and when the display request so as to display the job scheduling screen is carried out by the button B1 being operated in the touch panel 502, the operation display control section 503 outputs the operation signal based on the operation to the control section 101. The control section 101 which received the operation signal determines that it is the display timing of the job scheduling screen and displays the after-mentioned job scheduling screen in the display section 501.

Moreover, the touch panel 502 is operated as the selecting section when selecting the reservation information R of the job having the after-mentioned stopping cause in the job scheduling screen in the display section 501. When the reservation information R of the job having the stopping cause is selected in the touch panel 502, the operation display control section 503 outputs the operation signal based on the operation to the control section 101. The control section 101 which received the operation signal displays the job information J of the job having the stopping cause which is selected by the touch panel 502 and the operation buttons B2 to B6 as the operation sections to carry out the execution change operation of the job on the job scheduling screen as described later.

Moreover, as the first operation section, the touch panel 502 is operated when a user instructs to display the setting change screen G (see FIG. 11) for changing the setting of the tray information.

In particular, the setting change screen G is displayed by a user operating the tray setting change button 504 on the job scheduling screen in a state where the job scheduling screen is displayed in the display section 501.

Moreover, as the second operation section, the touch panel 502 is operated when a user carries out the setting change of the tray information.

In particular, the setting change of the tray information is carried out by a user operating the tray selecting buttons B11 to B19, the tray information selecting button 505 and the setting complete button 506 on the setting change screen G in a state where the setting change screen G is displayed in the display section 501.

The image forming section 600 comprises the conveyance section 610, the LD (Laser Diode) section 620 and the printer control section 630. The image forming section 600 forms an image on a paper based on the image data inputted from the writing process section 106.

The conveyance section 610 comprises various types of rollers such as the paper feeding roller 611, the resist roller 612 and the paper ejection roller 613 for conveying a paper according to the conveyance path in the LD section 620, the conveyance path switching board 614, the inversing section 615 and the like. The conveyance section 610 feeds paper from a tray according to the setting condition of the job and conveys the fed paper according to the conveyance path based on the control from the printer control section 630.

Moreover, a plurality of sensors (omitted from the drawing) are provided on the conveyance path of the LD section 620. These sensors generate the detection signals when the paper passes by and outputs the detection signal to the printer control section 630.

The LD section 620 comprises the LD 621, a photoconductor drum 622, a charging section 623, a developing section 624, a transfer section 625, a fixing section 626 and the like.

Based on the instruction from the printer control section 630, the LD section 620 makes the surface of the photoconductor drum 622 of the LD section 620 be electrically changed by the charging section 623 and forms an electrostatic latent image by emitting laser beam to the surface of the photoconductor drum 622 by the LD 621 based on the PWM signal inputted from the writing process section 106. Thereafter, toner is attached to the region including the electrostatic latent image on the surface of the photoconductor drum 622 at the developing section 624 and an image is formed by transferring the toner on a paper by the transfer section 625. Then, after fixing the transferred image at the fixing section 626, the paper on which the image is formed is conveyed to the after processing section 30 by the paper ejection roller 613.

The printer control section 630 receives the control signal from the control section 101 and controls the operation of each part of the LD section 620. Further, the printer control section 630 counts the number of sheets of paper fed based on the detection signal from the sensors provided on the conveyance path and outputs the counted number to the control section 101.

Moreover, the printer control section 630 counts the number of sheets of paper fed by counting the sensor signal outputted from the sensors (omitted from the drawing) provided near the paper feeding roller 611 while each job is being executed and outputs the counted number to the control section 101.

As described above, in the image forming apparatus 1 of the embodiment, when paper cannot be fed by the paper feeding trays FT1 to FT9 or the post inserters PI1 and PI2, the image forming process by the image forming section 600 is to pause.

Here, there are three stopping causes in the stopping cause which makes the image forming process stop. At the display timing or the update timing of the job scheduling screen, the control section 101 predicts whether all of the image forming process of each job can be executed without stopping or not by determining whether each of the reserved jobs has any one of the three stopping causes which cause the image forming process to stop based on the setting condition of each of the reserved jobs and the tray-paper information of the tray information table 104a. Then, when there is a job having any one of the three stopping causes, the control section 101 displays the reservation information R of the job in the job scheduling screen so as to correspond to the stopping cause as described later.

At the display timing and the update timing of the job scheduling screen, the control section 101 orderly determines whether each of the jobs apply to any of the first to the third stopping causes which are explained later in the order of the first stopping cause, the second stopping cause and the third stopping cause.

The first stopping cause is a case where the tray-paper information which matches the tray setting information and the paper setting information does not exist. In particular, the first stopping cause is a case where the tray setting information does not exist and when the paper setting information exists, that is, a case where only paper is set as the setting condition of the job, In such case, the set paper itself is not set so as to be stored in any of the trays. Here, when the tray setting information as the setting condition of the job exists, that is, when a tray is set, the determination whether this case applies to the first stopping cause or not will not be carried out.

When paper is set as the setting condition of the job, the control section 101 determines whether the paper which is set as the setting condition of the job is set so as to be stored in any of the trays or not by referring to the tray information table 104a. Then, when the set paper is set to be stored in any of the trays, the control section 101 determines that the first stopping cause does not apply to the case. On the other hand, when the set paper is not set to be stored in any of the trays, the control section 101 determines that the first stopping cause applies to the case.

As described above, in the tray information table 104a of FIG. 3, it is set so as to store any of the paper among "regular paper/A4/62-71 g/m$^2$", "regular paper/A4/50-61 g/m$^2$", "high quality paper/A3/50-61 g/m$^2$" and "XX special paper/A4/62-71 g/m$^2$" in each of the paper feeding trays FT1 to FT9 and the post inserters PI1 and PI2 and papers other than the above cannot be fed, for example. Therefore, for example, when the paper in which the size is "B5" is assigned as the setting condition of the job, the control section 101 determines that the first stopping cause applies because any of the trays is not set so as to store the paper of size "B5".

When the control section determines that the case does not apply to the first stopping cause, the control section 101 moves to the determination of the second stopping cause.

The second stopping cause is a case where the tray-paper information matching with the tray setting information and the paper setting information exists and when the remaining amount of papers in the tray is zero. In particular, the second stopping cause is a case where at least the tray setting information exists, that is, a case where at least a tray is set as the setting condition of the job. In such case, paper is not stored in the set tray. Alternatively, the second stopping cause is a case where the tray setting information does not exist and the paper setting information exists, that is, a case where only paper is set as the setting condition of the job. In such case, paper is not stored in the tray which is selected according to the setting of the paper.

When a tray is set as the setting condition of the job or when paper stored in any of the trays is set as the setting condition of the job and when a tray is selected based on the setting of the paper, the control section 101 refers to the remaining amount of paper which is detected by the remaining amount detection sensor D provided at the set or selected tray and which is stored in the tray information table 104a. Then, the control section 101 determines that the case does not apply to the second stopping cause when the remaining amount of paper in the set tray or in the tray selected based on the setting of paper is more or equal to 1. On the other hand, the control section 101 determines that the case applies to the second stopping cause when the remaining amount of paper in the set tray or in the tray selected based on the setting of paper is zero.

For example, in a case where the paper feeding tray FT7 is set as the setting condition of the job or in a case where the paper (for example, regular paper/A4/50-61 g/m$^2$) is set as the setting condition of the job and where the paper feeding tray FT7 is automatically selected based on the setting, the control section 101 refers to the remaining amount of paper of the paper feeding tray FT7 detected by the remaining amount detection sensor D provided at the paper feeding tray FT7 and determines that the case applies to the second stopping cause when the remaining amount of paper is zero, that is, when not one sheet of paper is stored in the paper feeding tray FT7.

When the control section determines that the case does not apply to the second stopping cause, the control section 101 moves to the determination the third stopping cause.

The third stopping cause is a case where the tray-paper information matching the tray-setting information and the paper setting information exists and where the remaining amount of paper in the tray becomes zero while the job is in execution. In particular, the third stopping cause is a case where the remaining amount of paper in the set tray is more or equal to one sheet and where the remaining amount of paper is not sufficient for the number of sheets of paper planed to be used in the job when at least the tray setting information exists, that is, when at least a tray is set as setting condition of the job. Alternatively, the third stopping cause is a case where the remaining amount of paper in the tray selected based on the setting of paper is more or equal to one sheet and where the remaining amount of paper is not sufficient for the number of sheet of paper planed to be used in the job when the tray setting information does not exist and the paper setting information exists, that is, when only the paper is set as the setting condition of the job.

When a tray is set as the setting condition of the job or when the paper stored in any of the trays is set as the setting condition of the job and when the tray is selected based on the setting of paper, the control section 101 refers to the remaining amount of paper which is detected by the remaining amount detection sensor D provided at the tray which is set or selected and which is stored in the tray information table 104a. Then, when the remaining amount of paper in the tray which is set or which is selected based on the setting of paper is more or equal to the number of sheets of paper planed to be used, the control section 101 determines that the case does not apply to the third stopping cause. On the other hand, when the remaining amount of paper in the tray which is set or which is selected based on the setting of paper is more or equal to one sheet and when the remaining amount of paper is not sufficient to the number of sheets of paper planed to be used, the control section 101 determines that the case applies to the third stopping cause.

For example, when the paper feeding tray FT2 is set as the setting condition of the job or when the paper (for example, high quality paper/A3/50-61 g/m$^2$) is set as the setting condition of the job, and when the paper feeding tray FT2 is automatically selected based on the setting, the control section 101 detects the remaining amount of paper of the paper feeding tray FT2 by the remaining amount detection sensor D provided at the paper feeding tray FT2 and compares to the number of sheets of paper planed to be used of the paper set as the setting condition of the job. Then, when the detected remaining amount of paper is "130 sheets" and when the number of sheets of the paper planed to be used is "230 sheets", the control section 101 determines that the case applies to the third stopping cause because the remaining amount of paper is not sufficient to the number of sheets of paper planes to be used of the paper set as the setting condition of the job.

On the other hand, when the control section 101 determines that the case does not apply to the third stopping cause, the control section 101 determines that the job does not include any of the first to the third stopping causes and that all of the image forming processes for the number of sheets of paper to be used can be executed.

Figure 4:
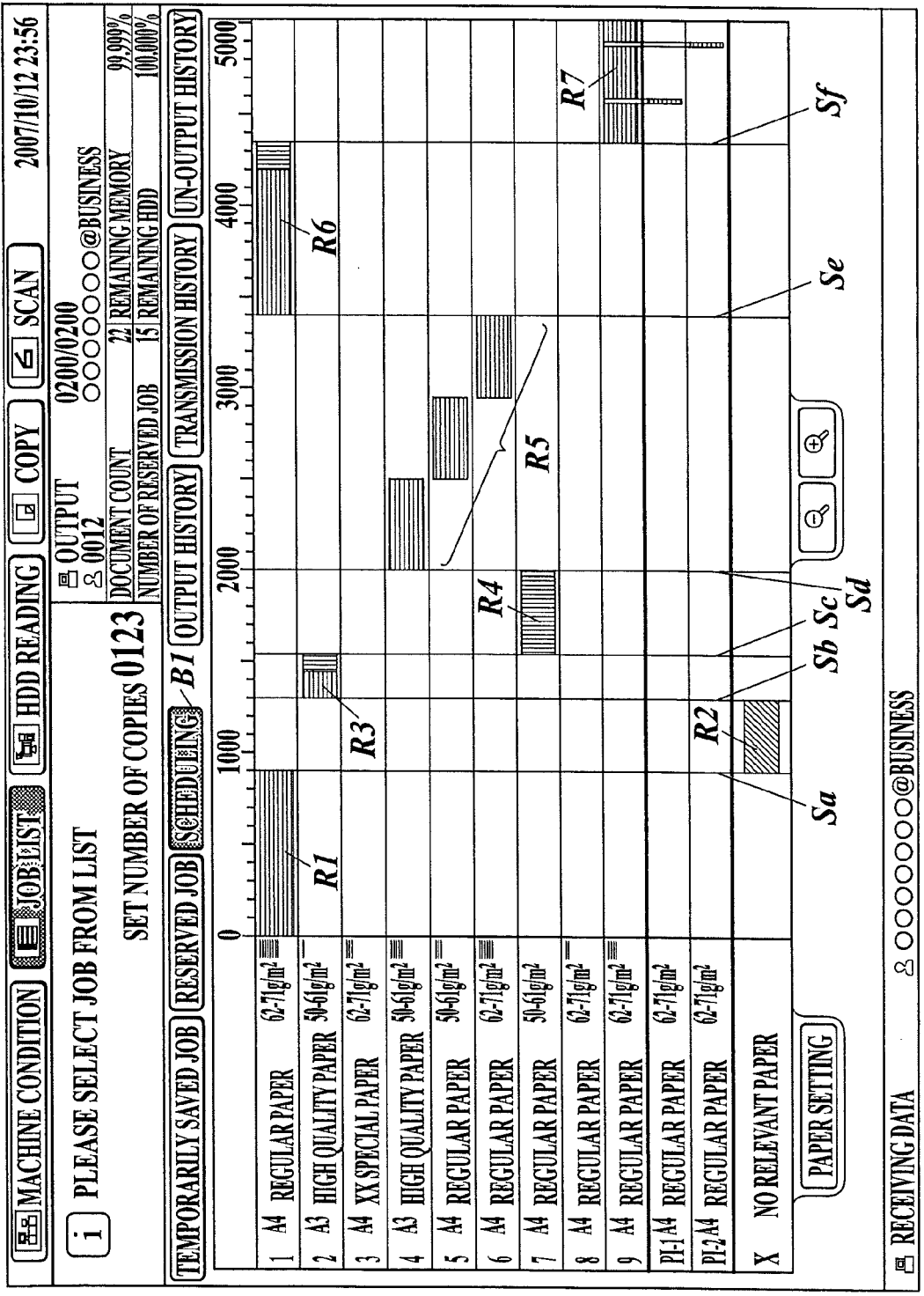
FIG. 4 is an example of a job scheduling screen.

In FIG. 4, the job scheduling screen displayed in the display section 501 is shown.

In the job scheduling screen of FIG. 4, a two dimensional chart having two axis which are orthogonal to one another is displayed. The first axis which is the vertical axis indicates the tray information and the second axis which is the horizontal axis indicates the number of sheets of paper planed to be used. Further, reservation information R1 to R7 of each of the jobs are displayed in the two dimensional chart. The tray information is information relating to trays which can be set as the trays to be used, that is, information relating to the paper feeding trays FT1 to FT9 and the post inserters PI1 and PI2. The tray information coordinates with the tray-paper information stored in the tray information table 104a, and the job scheduling screen is also updated when the tray-paper information of the tray information table 104a is changed. Further, as described later, the reservation information R is information which indicates the tray to be used and the number of sheets of paper planed to be used by the reservation information R being displayed in a region formed of a position on the first axis corresponding to the tray to be used and a position on the second axis for a length corresponding to the number of sheets of paper planed to be used.

Here, in the job scheduling screen of FIG. 4, the reservation information R1 of the job which is in execution is also displayed as the job which is first in the reserved order of execution. As for the job which is in execution, the remaining number of sheets of the paper at the timing of display/update of the job scheduling screen is the number of sheets of paper planed to be used.

As shown in FIG. 4, the first axis on the job scheduling screen indicates the tray information, and is divided in 11 rows corresponding to the paper feeding trays FT1 to FT9 and the post inserters PI1 and PI2 and in 1 row corresponding to the above described first stopping cause.

That is, in the job scheduling screen of FIG. 4, the first row which is the top row is a region corresponding to the "paper feeding tray FT1" and the paper of "regular paper/A4/62-71 g/m$^2$" which is to be stored in the paper feeding tray FT1 is displayed.

Further, the second row is a region corresponding to the "paper feeding tray FT2" and the paper of "high quality paper/A3/50-61 g/m$^2$" which is to be stored in the paper feeding tray FT 2 is displayed.

Further, the third row is a region corresponding to the "paper feeding tray FT3" and the paper of "XX special paper/A4/62-71 g/m$^2$" which is to be stored in the paper feeding tray FT3 is displayed.

Further, the fourth row is a region corresponding to the "paper feeding tray FT4" and the paper of "high quality paper/A3/50-61 g/m$^2$" which is to be stored in the paper feeding tray FT4 is displayed.

Further, the fifth row is a region corresponding to the "paper feeding tray FT5" and the paper of "regular paper/A4/50-61 g/m$^2$" which is to be stored in the paper feeding tray FT5 is displayed.

Further, the sixth row is a region corresponding to the "paper feeding tray FT6" and the paper of "regular paper/A4/62-71 g/m$^2$" which is to be stored in the paper feeding tray FT6 is displayed.

Further, the seventh row is a region corresponding to the "paper feeding tray FT7" and the paper of "regular paper/A4/50-61 g/m$^2$" which is to be stored in the paper feeding tray FT7 is displayed.

Further, the eighth row is a region corresponding to the "paper feeding tray FT8" and the paper of "regular paper/A4/62-71 g/m$^2$" which is to be stored in the paper feeding tray FT8 is displayed.

Further, the ninth row is a region corresponding to the "paper feeding tray FT9" and the paper of "regular paper/A4/62-71 g/m$^2$" which is to be stored in the paper feeding tray F9 is displayed.

Further, the tenth row is a region corresponding to the "post inserter PI1" and the paper of "regular paper/A4/62-71 g/m$^2$" which is to be stored in the post inserter PI1 is displayed.

Further, the eleventh row is a region corresponding to the "post inserter PI2" and the paper of "regular paper/A4/62-71 g/m$^2$" which is to be stored in the post inserter PI2 is displayed.

Moreover, as shown in FIG. 4, remaining amounts of paper detected by the remaining amount detection sensors D provided at each of the paper feeding trays FT are roughly displayed in the first row to the ninth row corresponding to the paper feeding trays FT 1 to FT9 in the first axis. In FIG. 4, the remaining amount of paper is expressed in the number of lines.

Further, as shown in FIG. 4, scales indicating the number of sheets of paper planed to be used are displayed in the second axis on the job scheduling screen. The origin of the second axis shows zero sheets, and one scale indicates 100 sheets.

In such job scheduling screen, the control section 101 specifies the tray which is used in each job based on the tray setting information and the paper setting information as the setting condition of each job stored in the non-volatile memory 104 and the control section 101 displays the reservation information R1 to R7 of each job in the job scheduling screen at positions on the first axis corresponding to the specified trays (that is, the first row to the twelfth row).

Further, the control section 101 makes lengths of the reservation information R1 to R7 respectively for each job in the second axis direction in the job scheduling screen so as to correspond to the number of sheets of paper planed to be used based on the number of sheets of paper planed to be used as the setting condition of each job stored in the non-volatile memory 104.

In such way, in the job scheduling screen, the reservation information R1 to R7 respectively for each job are displayed at a position on the first axis corresponding to the tray to be used and a position on the second axis for a length corresponding to the number of sheets of paper planed to be used. Therefore, the number of sheets of paper planed to be used for each tray in each job and in the entire job can be known.

That is, as shown in FIG. 4, by the control section 101 displaying the reservation information R1 of the job which is first in the reserved order of execution in the first row corresponding to the paper feeding tray FT1 to be used, and also by the control section 101 making the length of the reservation information R1 in the second axis direction be as long as nine scale corresponding to the number of sheets of paper planed to be used of "900 sheets", it can be recognized that the job which is first in the reserved order of execution uses 900 sheets of the paper in the paper feeding tray FT1.

Further, by the control section 101 displaying the reservation information R3 of the job which is third in the reserved order of execution in the second row corresponding to the paper feeding tray FT2 to be used, and also by the control section 101 making the length of the reserved information R3 in the second axis direction so as to be as long as 2.3 scales which corresponds to the number of sheets of paper planed to be used of "230 sheets", it can be recognized that the job which is third in the reserved order of execution uses 230 sheets of the paper in the paper feeding tray FT2.

Moreover, by the control section 101 displaying the reservation information R4 of the job which is fourth in the reserved order of execution in the seventh row corresponding to the paper feeding tray FT7 to be used, and also by the control section 101 making the length of the reservation information R4 in the second axis direction be as long as 4.7 scales corresponding to the number of sheets of paper planed to be used of "470 sheets", it can be recognized that the job which is fourth in the reserved order of execution uses 470 sheets of the paper in the paper feeding tray FT7.

Further, by the control section 101 displaying the reservation information R6 of the job which is sixth in the reserved order of execution in the first row corresponding to the paper feeding tray FT1 to be used, and also by the control section 101 making the length of the reservation information R6 in the second axis direction be as long as 9.5 scales corresponding to the number of sheets of paper planed to be used of "950 sheets", it can be recognized that the job which is sixth in the reserved order of execution uses 950 sheets of the paper in the paper feeding tray FT1.

Furthermore, when a plurality of trays are to be used in one job, the control section 101 divides and displays the reservation information R of the job at positions on the first axis respectively corresponding to each of the trays to be used, and also the control section 101 makes the length of the reservation information R corresponding to each of the trays in the second axis direction so as to be as long as the length corresponding to the number of sheets of paper planed to be used by the tray. Therefore, the number of sheets of paper planed to be used in the entire job and the number of sheets of paper planed to be used for each tray can be known.

That is, as shown in FIG. 4, the control section 101 divides and displays the reservation information R5 of the job which is fifth in the reserved order of execution in the fourth row to the sixth row corresponding to the paper feeding trays FT1 to FT6 to be used, and also the control section 101 makes the length of each of the three reservation information R which is divided in the second axis direction so as to be as long as the scales corresponding to the number of sheets of paper planed to be used for each of the paper feeding trays FT4 to FT6. In such way, it can be recognized that the job which is fifth in the reserved order of execution uses 500 sheets of the paper stored in the paper feeding tray FT4, uses 450 sheets of the paper stored in the paper feeding tray FT5 and uses 450 sheets of the paper stored in the paper feeding tray FT6. Further, it can be recognized that 1400 sheets of papers will be used in the entire job.

Moreover, regarding the job which is seventh in the reserved order of execution, by the control section 101 displaying the reservation information R7 of the job in the ninth to the eleventh row corresponding to the paper feeding tray FT9 and the post inserters PI1 and PI2, it can be recognized that the job which is seventh in the reserved order of execution carries out the image forming on the paper fed from the paper feeding tray FT1 and that the paper fed from the post inserters PI1 and PI2 are inserted between the papers fed from the paper feeding tray FT1. Further, it can be recognized where the paper from the post inserters PI1 and PI2 are to be inserted.

Further, as described above, the control section 101 determines whether each of the jobs applies to any one of the first stopping cause, the second stopping cause and the third stopping cause or not. When it is determined that a job applies to any one of the stopping causes, the control section 101 displays the reservation information R of the job in the job scheduling screen so as to be in a mode corresponding to the stopping cause.

In such way, the job having a stopping cause and the job not having a stopping cause can be easily recognized in a glance on the job scheduling screen. Also, regarding the job having a stopping cause, it can be easily known the job has which of the first stopping cause, the second stopping cause and the third stopping cause.

In particular, regarding the job which does not apply to any of the first stopping cause, the second stopping cause and the third stopping cause, the control section 101 displays all of the reservation information R of the job in the first color (for example, blue).

For example, when the paper feeding tray FT1 and the number of sheets of paper planed to be used "900 sheets" are specified as the setting condition of the job which is first in the reserved order of the execution, the control section 101 calculates the remaining amount of the paper at the time when execution of the job starts based on the remaining amount of paper detected by the remaining amount detection sensor D provided at the paper feeding tray FT1 and the number of sheets of paper planed to be used in jobs which use the same paper feeding tray FT1 and which comes before in the reserved order of execution. That is, when the remaining amount of paper detected by the remaining amount detection sensor D is "1700 sheets" and when there is no job which uses the same paper feeding tray FT1 and which comes before in the reserved order of execution, the remaining amount of paper in the paper feeding tray FT1 at the time when the execution of the job which is first in the reserved order of execution starts is "1700 sheets". Further, the control section 101 compares the remaining amount of paper in the paper feeding tray FT1 at the time when the job which is first in the reserved order of execution starts which is "1700 sheets" to the number of sheets of paper planed to be used in the job which is "900 sheets". When the control section 101 determines the remaining amount of paper in the paper feeding tray FT1 at the time when the execution of the job starts which is "1700 sheets" is more or equal to the number of sheets of paper planed to be used in the job which is "900 sheets", the control section displays all of the reservation information R1 of the job in blue.

In such way, by all of the reservation information R1 of the job being displayed in the first color in the job scheduling screen, a user can easily recognize that all of the image forming process of the job can be executed.

Moreover, the control section 101 displays all of the reservation information R of the job which applies to the above described first stopping cause at a position on the first axis where indicates that there is no tray corresponding to the set paper (that is, the twelfth row) in the second color (for example, brown). In the job scheduling screen of FIG. 4, it is displayed as "no relevant paper" in the twelfth row, therefore it can be easily known that the setting itself of the paper which is set as the setting condition of the job does not exist.

For example, when the paper of "regular paper/B5/50 to 61 g/m$^2$" which is not set so as to be stored in any one of the paper feeding trays FT1 to FT9 is set as the setting condition of the job which is second in the reserved order of execution, the control section 101 displays the reservation information R2 of the job in brown in the twelfth row on the first axis which is displayed as "no relevant paper".

In such way, by the reservation information R2 of the job being displayed in the second color at the position on the first axis indicating that there is no tray that corresponds to the set paper in the job scheduling screen, a user can easily recognize that the image forming process of the job will stop due to the first stopping cause, that is, that the paper which cannot be used is set as the setting condition of the job.

Moreover, the control section 101 displays all of the reservation information R of the jobs to which the second stopping cause is applied in the third color (for example, red).

For example, when the paper feeding tray FT7 is specified as the setting condition of the job which is fourth in the reserved order of execution, the control section 101 calculates the remaining amount of paper at the time when the execution of the job starts based on the remaining amount of paper detected by the remaining amount detection sensor D provided at the paper feeding try FT7 and the number of sheets of paper planed to be used in jobs which uses the same paper feeding tray FT7 and which come before in the reserved order of execution. When the remaining amount of paper at the time when the execution of the job starts is zero, the control section 101 displays all of the reservation information R of the job in red.

In such way, by all of the reservation information R of the job being displayed in the job scheduling screen in the third color indicating that the remaining amount of paper in the set tray is zero or that the remaining amount of paper in the tray which is selected based on the setting of paper is zero, a user can easily recognize that the image forming process of the job will stop due to the second stopping cause, that is, that paper is not stored in the tray which is set as the setting condition of the job or in the tray corresponding to the set paper and that the number of sheets of papers planed to be used set as the setting condition of the job is entirely insufficient.

Furthermore, the control section 101 displays the display region for the length in the second axis direction corresponding to the remaining amount of paper in the first color (for example, blue). Also, the control section 101 displays the display region worth the length in the second axis direction corresponding to insufficient amount of paper in the third color (for example, red).

For example, when the paper feeding tray FT1 and the number of sheets of paper planed to be used which is "950 sheets" are set as the setting condition of the job which is sixth in the reserved order of execution, the control section 101 calculates the remaining amount of paper at the time when the execution of the job starts based on the remaining amount of paper detected by the remaining amount detection sensor D provided at the paper feeding tray FT1 and the number of sheets of paper planed to be used of jobs which use the same paper feeding tray FT1 and which come before in the reserved order of execution. That is, when the remaining amount of paper detected by the remaining amount detection sensor D is "1700 sheets" and when the number of sheets of paper planed to be used in the job which is first in the reserved order of execution and which uses the same paper feeding tray FT1 is "900 sheets", the remaining amount of paper in the paper feeding tray FT1 at the time when the job which is sixth in the reserved order of execution starts is "800 sheets". Further, the control section 101 compares the remaining amount of paper "800 sheets" in the paper feeding tray FT1 at the time the job which is sixth in the reserved order of execution starts to the number of sheets of paper planed to be used in the job which is "950 sheets". When the control section 101 determines that the remaining amount of paper of "800 sheets" in the paper feeding tray FT1 at the time when execution of the job starts is less than the number of sheets of paper planed to be used in the job which is "950 sheets", the control section calculates the difference between the number of sheets of paper planed to be used and the remaining amount of paper. Then, the control section 101 displays a length in the second axis direction corresponding to the remaining amount of paper, that is, a display region worth 8 scales in blue within the reservation information R6 of the job. Further, the control section 101 displays the difference between the number of sheets of paper planed to be used and the remaining amount of paper which is "150 sheets" as the insufficient amount by displaying the length in the second axis direction corresponding to the insufficient amount, that is, the display region worth 1.5 scales in red.

In such way, the reservation information R6 of the job is displayed in the first color and the third color which indicate that the remaining amount of paper in the set tray or in the tray selected based on the setting of paper is 1 sheet or more and is equal to the number of sheets of paper planed to be used or less in the job scheduling screen. Therefore, a user can easily recognize that the image forming process of the job will stop due to the third stopping cause, that is, that the remaining amount of paper in the tray set as the setting condition of the job or in the tray corresponding to the set paper is insufficient. Further, by the display region for the length corresponding to the insufficient amount within the reservation information R6 of the job being displayed in the third color, a user can easily recognize the insufficient amount of paper.

Moreover, the control section 101 integrates the number of sheets of paper planed to be used in each of the jobs in the order of reserved order of execution based on the setting condition of each job stored in the non-volatile memory 104. Then, by the control section 101 displaying the reservation information R of each job in the job scheduling screen at positions in the second axis direction where the number of sheets of paper planed to be used in jobs which come before in the reserved order of execution than the job is integrated, the cumulative total of the number of sheets of paper planed to be used at an arbitrary time while each job is in execution can be known.

In particular, as shown in FIG. 4, the control section 101 displays the reservation information R1 of the job which is first in the reserved order of execution at the position on the second axis starting from the start point which is the origin of the second axis in the second axis direction to the end point which is the position proceeding 9 scales which corresponds to the number of sheets of paper planed to be used which is "900 sheets" of the job.

Next, the control section 101 displays the reservation information R2 of the job which is second in the reserved order of execution at the position on the second axis starting from the start point which is the position on the second axis indicating the number of sheets of paper planed to be used which is "900 sheets" of the job which is first in the reserved order of execution (that is a position proceeding 9 scales from the origin) in the second axis direction to the end point which is the position proceeding 4 scales which corresponds to the number of sheets of paper planed to be used which is "400 sheets" in the job (that is a position proceeding 13 scales from the origin).

Next, the control section 101 calculates the integrated value "1300 sheets" which is the number of sheets of paper planed to be used in the jobs which are first and second in the reserved order of execution. Then, the control section 101 displays the reservation information R3 of the job which is third in the reserved order of execution at the position on the second axis from the start point which the position on the second axis indicating the integrated value "1300 sheets" which is the number of sheets of paper planned to be used in the jobs which come before in the reserved order of execution (that is a position proceeding 13 scales from the origin) in the second axis direction to the end point which is the position proceeding 2.3 scales which corresponds to the number sheets of paper planed to be used "230 sheets" of the job (that is a position proceeding 15.3 scales from the origin).

Next, the control section 101 calculates the integrated value "1530 sheets" which is the number of sheets of paper planed to be used in the jobs which are first, second and third in the reserved order of execution. Then, the control section 101 displays the reservation information R4 of the job which is fourth in the reserved order of execution at the position on the second axis starting from the start point which is a position on the second axis indicating the integrated value "1530 sheets" which is the number of sheets of paper planed to be used in the jobs which come before in the reserved order of execution (that is a position proceeding 15.3 scales from the origin) in the second axis direction to the end point which is the position proceeding 4.7 scales which corresponds to the number of sheets of paper planed to be used which is "470 sheets" of the job (that is a position proceeding 20 scales from the origin).

Next, the control section 101 calculates the integrated value "2000 sheets" which is the number of sheets of paper planed to be used in the jobs which are first to fourth in the reserved order of execution. Then, the control section 101 displays the reservation information R5 of the job which is fifth in the reserved order of execution at the position on the second axis starting from the start point which is the position on the second axis indicating the integrated value "2000 sheets" which is the number of sheets of paper planed to be used in the jobs which come before in the reserved order of execution (that is a position proceeding 20 scales from the origin) in the second axis direction to the end point which is the position proceeding 14 scales which corresponds to the number of sheets of paper planed to be used "1400 sheets" in the job (that is a position proceeding 34 scales from the origin).

Next, the control section 101 calculates the integrated value "3400 sheets" which is the number of sheets of paper planed to be used in the jobs which are from first to fifth in the reserved order of execution. Then, the control section 101 displays the reservation information R6 of the job which is sixth in the reserved order of execution at the position on the second axis starting from the start point which is the position on the second axis indicating the integrated value "3400 sheets" which is the number of sheets of paper planed to be used in the jobs which come before in the reserved order of execution (that is a position proceeding 34 scales from the origin) in the second axis direction to the end point which is the position proceeding 9.5 scales which corresponds to the number of sheets of paper planed to be used which is "950 sheets" in the job (that is a position proceeding 43.5 scales from the origin).

Next, the control section 101 calculates the integrated value "4350 sheets" which is the number of sheets of paper planed to be used in the jobs which are from first to sixth in the reserved order of execution. Then, the control section 101 displays the reservation information R7 of the job which is seventh in the reserved order of execution at the position on the second axis starting from the start point which is the position on the second axis indicating the integrated value "4350 sheets" which is the number of sheets of paper planed to be used in the jobs which come before in the reserved order of execution (that is a position proceeding 43.5 scales from the origin) to the end point which is the right end of the two-dimensional chart because the number of sheets of paper planed to be used in the job is more or equal to "650 sheets" which correspond to 6.5 scales that remains in the second axis direction.

Moreover, by the control section 101 displaying partition lines Sa to Sf in the first axis in the job scheduling screen so as to be parallel to one another indicating where each job separates in the second axis, the reservation information R1 to R7 of each job can be distinguished individually.

That is, as shown in FIG. 4, the control section 101 displays the partition line Sa between the reservation information R1 of the job which is first in the reserved order of execution and the reservation information R2 of the job which is second in the reserved order of execution. Further, the control section 101 displays the partition line Sb between the reservation information R2 of the job which is second in the reserved order of execution and the reservation information R3 of the job which is third in the reserved order of execution. Further, the control section 101 displays the partition line Sc between the reservation information R3 of the job which is third in the reserved order of execution and the reservation information R4 of the job which is fourth in the reserved order of execution. Further, the control section 101 displays the partition line Sd between the reservation information R4 of the job which is fourth in the reserved order of execution and the reservation information R5 of the job which is fifth in the reserved order of execution. Further, the control section 101 displays the partition line Se between the reservation information R5 of the job which is fifth in the reserved order of execution and the reservation information R6 of the job which is sixth in the reserved order of execution. Further, the control section 101 displays the partition line Sf between the reservation in information R6 of the job which is sixth in the reserved order of execution and the reserved information R7 of the job which is seventh in the reserved order of execution. In such way, the information of each of the jobs which are from first to seventh in the reserved order of execution can be easily known by being distinguished from the information of the jobs which come before and after in the reserved order of execution.

Moreover, the control section 101 updates the display position of each reservation information R in the job scheduling screen at a predetermined update timing by setting the original point of the second axis as the present point.

Here, the predetermined update timing is when the image forming process to a predetermined number of papers is finished or when a predetermined time has passed since the previous update timing. Which timing is to be set as the update timing of the job scheduling screen can be set in advance by a user by operating the touch panel 502 in the setting screen (omitted from the drawing). Here, when the update timing has not arrived at all after the job scheduling screen is displayed, the timing when the job scheduling screen is displayed is set as the previous update timing.

In a case where the update timing is set to when the image forming process with respect to the predetermined number of papers is finished, in addition, it can be set in every how many sheets of paper the update is to be carried out. For example, a user can set so that the update of the job scheduling screen is to be carried out every 1 sheet of paper, every 10 sheets of paper or every 100 sheets of paper.

On the other hand, in a case where the update timing is set to when a predetermined time has passed since the previous update timing, in addition, it can be set in every how many seconds/how many minutes/how many hours the update is to be carried out. For example, a user can set so that the update of the job scheduling screen is to be carried out every 10 seconds, every 60 seconds or every 10 minutes.

The information relating to the update timing set by a user is outputted to the control section 101 via the operation display control section 503 and is stored in the non-volatile memory 104.

Figure 5:
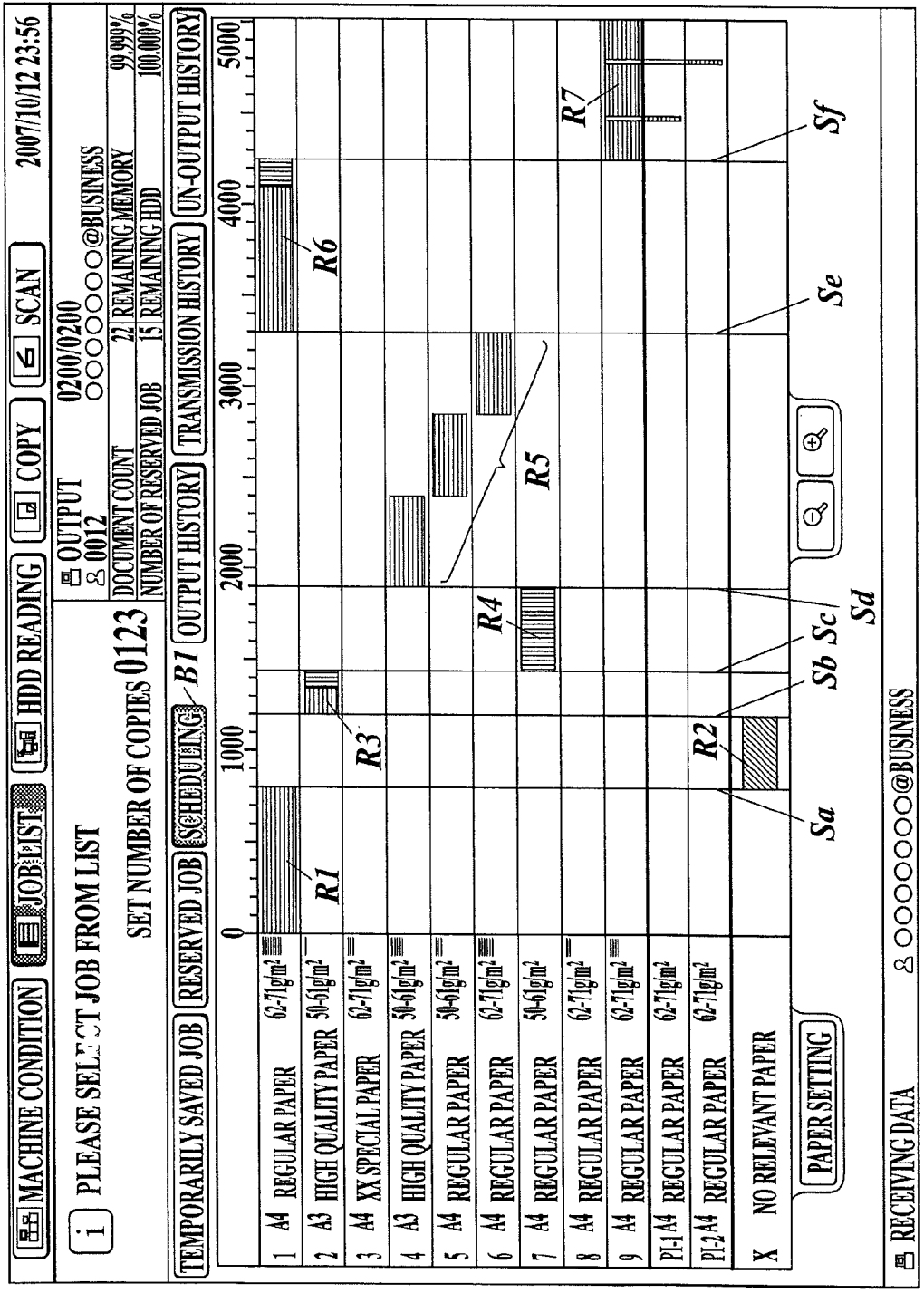
FIG. 5 is an example of a job scheduling screen after updating.

In FIG. 5, the job scheduling screen which is updated at the update timing is shown.

The job scheduling screen in FIG. 5 is a screen in which the job scheduling screen of FIG. 4 is updated based on the setting condition of each job at the time at the update timing when the new image forming process to 100 sheets of paper is finished since the timing when the job scheduling screen of FIG. 4 is displayed or updated.

Moreover, when the reservation information R of the job having a stopping cause is selected by the touch panel 502 in the job scheduling screen in which the reservation information R1 to R7 of a plurality of reserved jobs are displayed, the control section 101 displays the job information J of the job and the operation buttons B2 to B6 for carrying out the execution change operation of the job on the job scheduling screen at a position not overlapping any of the reservation information R and the job information J.

Here, the job information J to be displayed in the job scheduling screen includes the file name and the user name of the job and the setting condition of the job. Further, the setting condition of the job to be displayed as the job information J includes the tray setting information, paper type, paper size and basis weight as the paper setting information and the number of sheets of paper planed to be used.

At this time, when the tray setting information exists and when the paper setting information does not exist, that is, when a user carried out setting only for the tray, the control section 101 displays the paper type, the paper size and the basis weight of the paper stored in the set tray as the paper setting information based on the tray information table 104a. Further, when the tray setting information does not exist and the paper setting information exists, that is, when the setting is carried out only for paper, the control section 101 displays the tray which is automatically selected based on the setting of paper as the tray setting information. Here, when the tray setting information exists and when the paper setting information does not exist, the control section 101 may display the paper setting information as "no setting", and when the tray setting information does not exist and when the paper setting information exists, the control section 101 may display the tray setting information as "no setting".

Moreover, the operation to carrying out change in the reserved order of execution of a job, the operation to carry out deletion of a job, the operation to carry out holding of a job and the operation to carry out change of setting condition of a job are included in the execution change operation of a job. Further, the changing of reserved order of execution of a job, the deletion of a job, the holding of a job and the changing of setting condition of a job are all together called the execution change process of a job.

Figure 6:
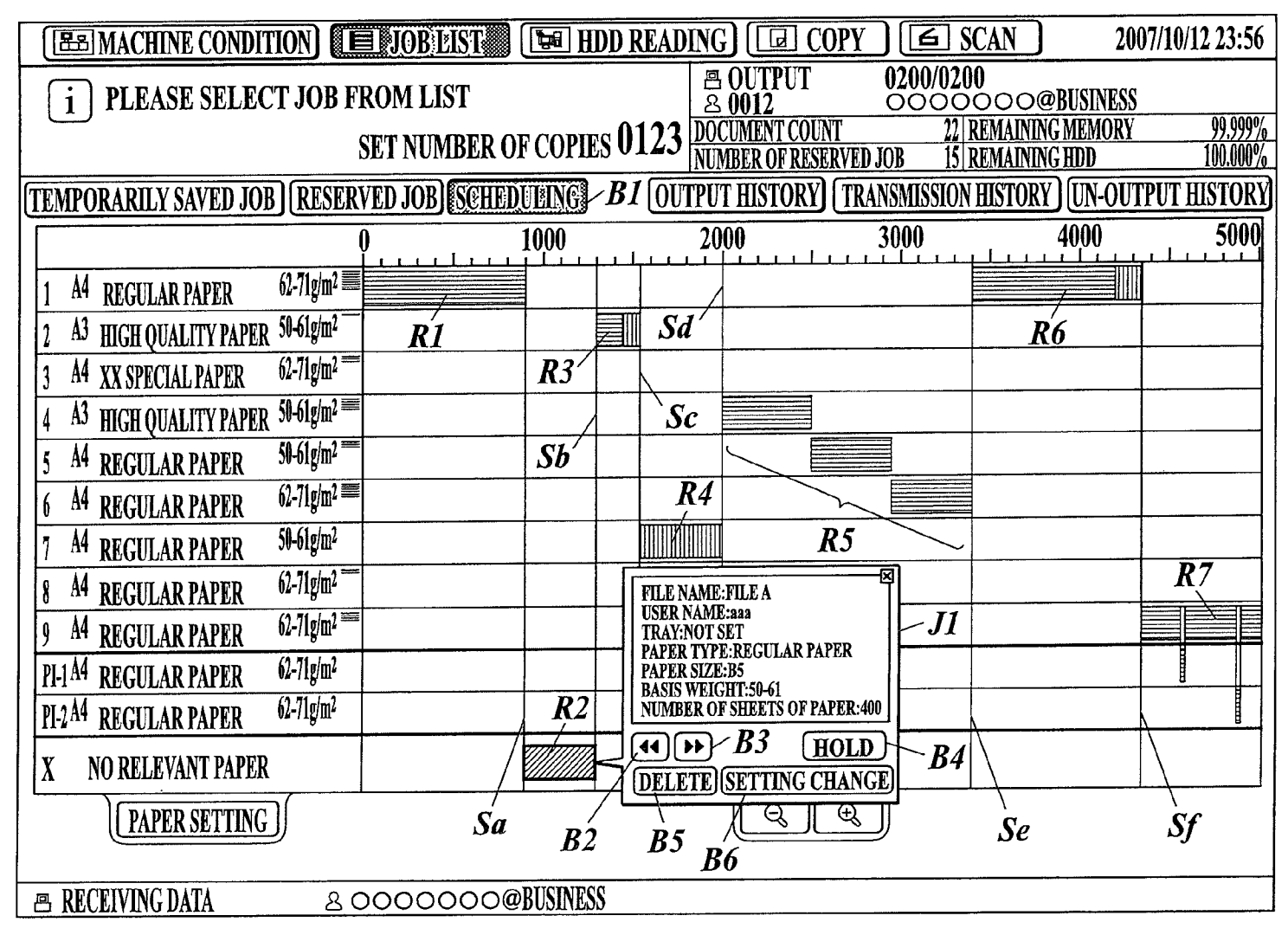

For example, when a user selects the reservation information R2 of the job which is second in the reserved order of execution having the first stopping cause by operating the touch panel 502 on the job scheduling screen of FIG. 4, the control section 101 displays the job information J1 of the job which is second in the reserved order of execution on the job scheduling screen as shown in FIG. 6 based on the setting information of the job stored in the non-volatile memory 104.

The job information J1 of the job which is second in the reserved order of execution displayed in the job scheduling screen of FIG. 6 displays the fine name "file A", the user name "a a a", the tray setting information "no setting", the paper type "regular paper", the paper size "B5" and the basis weight "50-61 g/m$^2$" as the paper setting information and the number of sheets of paper planed to be used "400 sheets" in a pop-up cell.

As described above, because the reservation information R2 of the job is displayed at the twelfth row on the first axis indicating that there is no tray which corresponds to the set paper in the second color (for example, brown), a user can easily recognize that the paper which cannot be used is set as the setting condition of the job. Further, by the job information J1, a user can confirm the file name, the user name, the tray setting information, the paper setting information and the number of sheets of paper planed to be used of the job to promptly carry out an appropriate approach for not stopping the job which is second in the reserved order of execution.

Moreover, in the job scheduling screen of FIG. 6, the operation buttons B2 to B6 for carrying out the execution change operation of the job which is second in the reserved order of execution are also displayed in the pop-up cell along with the job information J1 displayed by selecting the reservation information R1. When the operation buttons B2 to B6 are operated by the touch panel 502 on the job scheduling screen of FIG. 6, the control section 101 carries out the execution change process according to the operated operation button to the job which is second in the reserved order of execution.

Here, the operation button B2 is a button for moving down the reserved order of execution of the job by one place and the operation button B3 is a button for moving up the reserved order of execution of the job by one place. Every time the operation buttons B2 and B3 are operated, the control section 101 moves down/moves up the reserved order of execution of the targeted job by one place and updates the setting information of the job stored in the non-volatile memory 104.

Moreover, the operation button B4 is a button for holding the execution of the job. When the control section 101 detects the operation of the operation button B4, the control section 101 holds the execution of the targeted job by changing the state of the job to hold state from reserved state and deletes the reservation information R of the job from the job scheduling screen once. Thereafter, when the execution of the job is instructed, the control section 101 makes the job return in the reserved state and restores the reservation information R of the job in the job scheduling screen to execute the job according to the reserved order of execution.

Moreover, the operation button B5 is a button for deleting a job. When the control section 101 detects the operation of the operation button B5, the control section 101 deletes the setting information of the targeted job stored in the non-volatile memory 104 and deletes the reservation information R of the job from the job scheduling screen.

Further, the operation button B6 is a button for changing the setting condition of a job. When the control section 101 detects the operation of the operation button B6, the control section 101 displays the setting change screen (omitted from the drawing) for changing the setting condition of the targeted job. In the setting change screen, the setting condition of the job, that is, the tray setting information to set the tray which is used in the job, the paper setting information to set the paper type, the paper size and the basis weight of the paper which is used in the job and the number of sheets of paper planed to be used can be changed, and the control section 101 updates the setting information of the job stored in the non-volatile memory 104 based on the changes made to the setting condition of the job in the setting change screen.

Accordingly, a user can confirm the file name, the user name, the tray setting information, the paper setting information and the number of sheets of paper planed to be used of the job which is second in the reserved order of execution having the first stopping cause on the job scheduling screen first, and then a user can promptly carry out an appropriate execution change operation corresponding to the job on the same screen.

Figure 7:
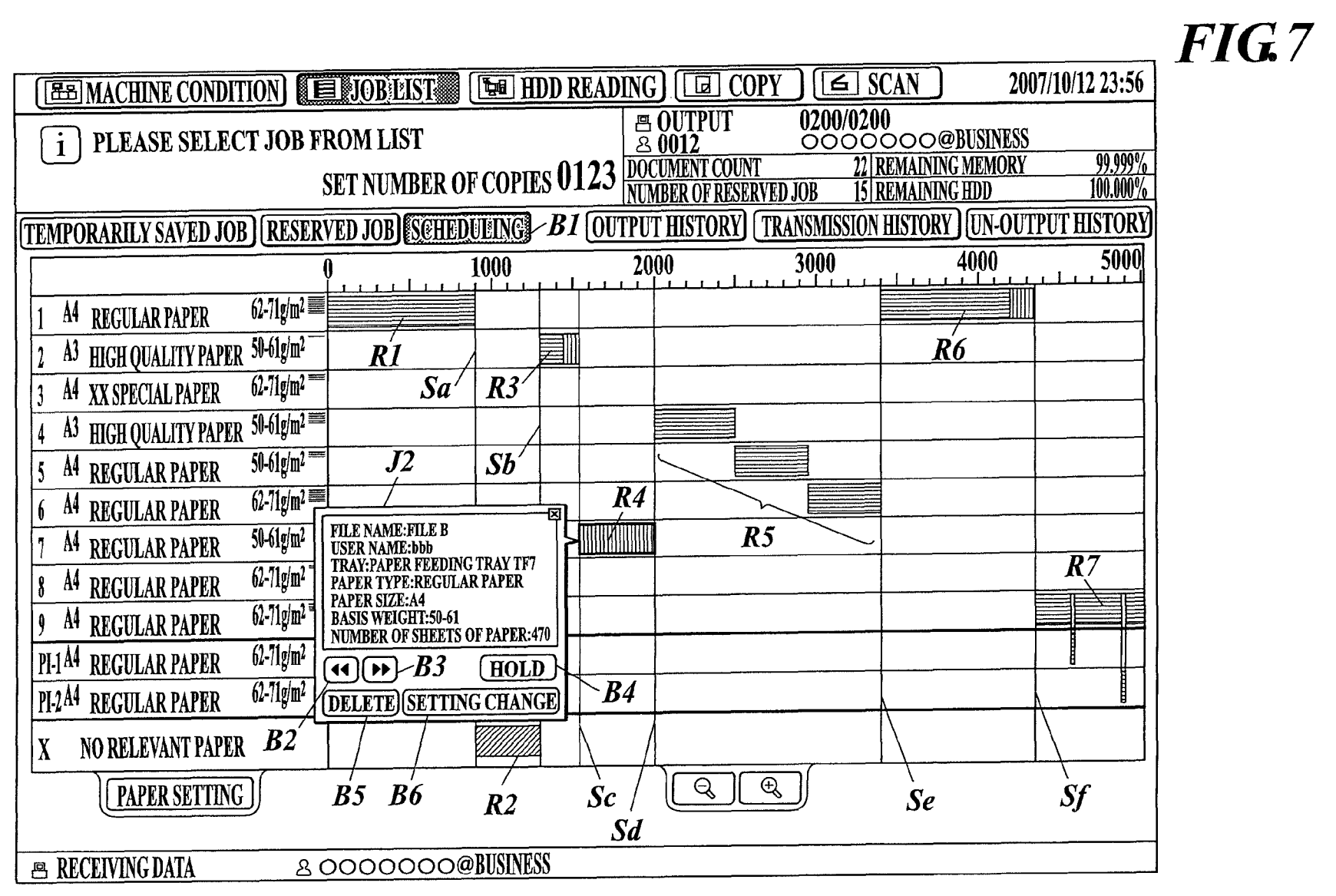

Moreover, when a user selects the reservation information R4 of the job which is fourth in the reserved order of execution having the second stopping cause by the operation of the touch panel 502 on the job scheduling screen of FIG. 4, the control section 101 displays the job information J2 of the job which is fourth in the reserved order of execution on the job scheduling screen as shown in FIG. 7 based on the setting information of the job stored in the non-volatile memory 104.

The job information J2 of the job which is fourth in the reserved order of execution displayed in the job scheduling screen of FIG. 7 shows the fine name "file B", the user name "b b b", the tray setting information "paper feeding tray FT7", the paper type "regular paper", the paper size "A4" and the basis weight "50-61 g/m$^2$" as the paper setting information and the number of sheets of paper planed to be used "470 sheets" in the pop-up cell.

Moreover, as described above, because the reservation information R4 of the job is displayed in the third color which indicates that the remaining amount of paper in the set tray or in the tray which is selected based on the setting of paper is zero, a user can easily recognize that there is no paper in the set tray or in the tray which is selected based on the setting of paper and that the entire image forming process cannot be carried out. Further, by the job information J2, a user can confirm the file name, the user name, the tray setting information the paper setting information and the number of sheets of paper planed to be used of the job, and then a user can promptly carry out an appropriate approach not the stop the job which is fourth in the reserved order of execution.

Moreover, in the job scheduling screen of FIG. 7, the operation buttons B2 to B6 for carrying out the execution change operation of the job which is fourth in the reserved order of execution are displayed in the pop-up cell along with the job information J2 which is displayed by selecting the reservation information R4. When the operation buttons B2 to B6 are operated by the touch panel 502 on the job scheduling screen of FIG. 7, the control section 101 executes the execution change process according to the operated operation button to the job which is fourth in the reserved order of execution.

Therefore, a user can confirm the file name, the user name, the tray setting information, the paper setting information and the number of sheets of paper planed to be used of the job which is fourth in reserved order of execution having the second stopping cause on the job scheduling screen first, and then a user can promptly carry out an appropriate execution change operation corresponding to the job in the same screen.

Figure 8:
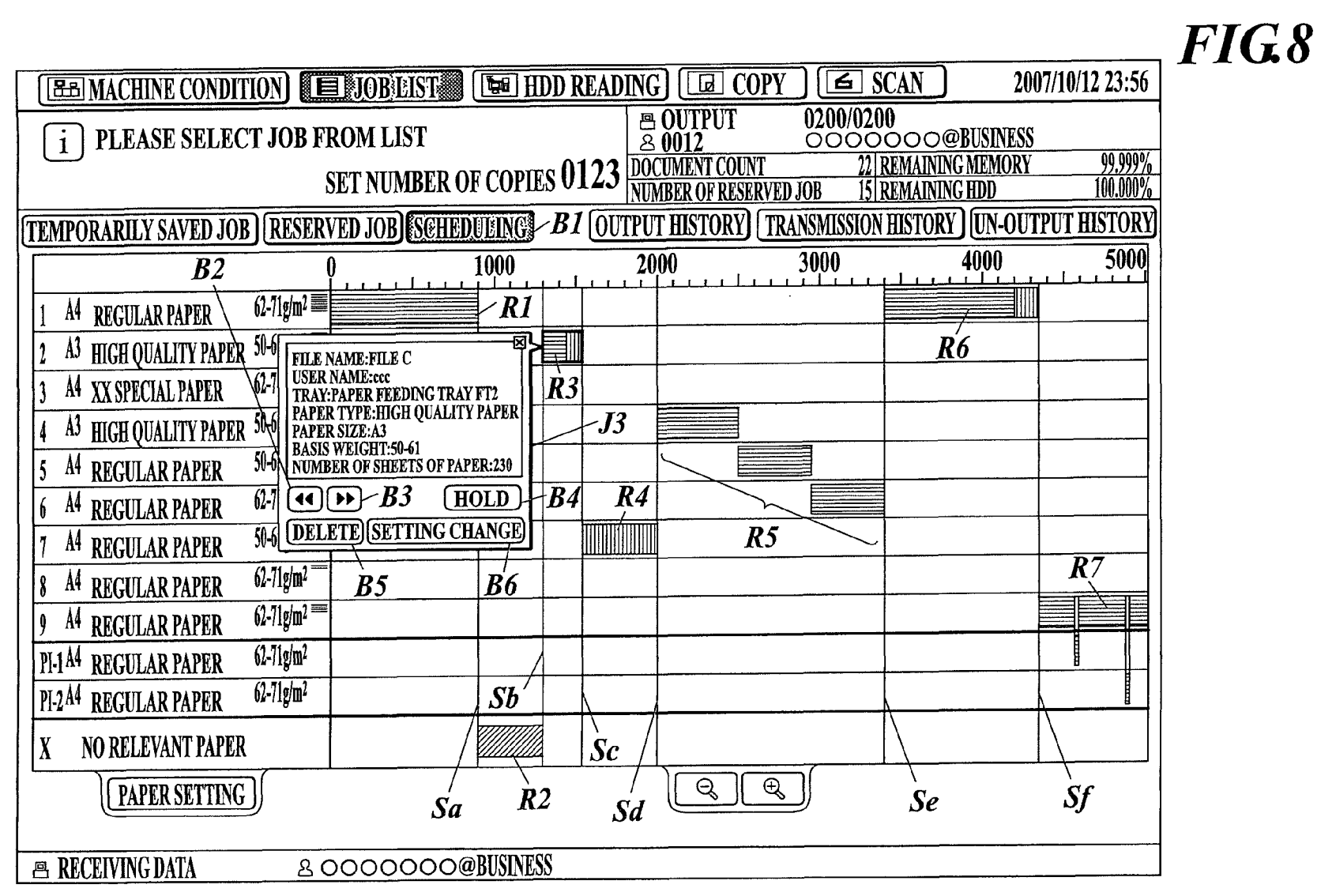

Moreover, in a case where the reservation information R3 of the job which is third in the reserved order of execution having the third stopping cause is selected by a user operating the touch panel 502 in the job scheduling screen of FIG. 4, the control section 101 displays the job information J3 of the job which is third in the reserved order of execution on the job scheduling screen as shown in FIG. 8 based on the setting information of the job stored in the non-volatile memory 104.

The job information J3 of the job which is third in the reserved order of execution displayed in the job scheduling screen of FIG. 8 shows the file name "file C", the user name "c c c", the tray setting information "paper feeding tray FT2", the paper type "high quality paper", the paper size "A3" and the basis weight "50-61 g/m²" as the paper setting information and the number of sheets of paper planed to be used "230 sheets" in the pop-up cell.

Moreover, as described above, because the reservation information R3 of the job is displayed in two colors of the first color and the third color indicating that the remaining amount of paper in the set tray or in the tray selected based on the setting of the paper is insufficient, a user can easily recognize that the image forming process will stop during the process because the paper in the set tray or in the tray selected based on the setting of paper is not enough. Further, the insufficient amount of paper "100 sheets" can be recognized by the length of the area displayed in the third color in the second axis direction among the reservation information R3. Moreover, by the job information J3, a user can confirm the file name, the user name, the tray setting information, the paper setting information, the number of sheets of paper planed to be used of the job so as to promptly carry out an appropriate approach not to stop the job which is third in the reserved order of execution.

Moreover, in the job scheduling screen of FIG. 8, the operation buttons B2 to B6 for carrying out the execution change operation of the job which is third in the reserved order of execution are displayed in the pop-up cell along with the job information J3 which is displayed by selecting the reservation information R2. When the operation buttons B2 to B6 are operated by the touch panel 502 on the job scheduling screen of FIG. 8, the control section 101 executes the execution change process according to the operated operation button to the job which is second in the reserved order of execution.

Therefore, a user can confirm the file name, the user name, the tray setting information, the paper setting information and the number of sheets of paper planed to be used of the job which is third in the reserved order of execution having the third stopping cause first, and then a user can promptly carry out an appropriate execution change operation corresponding to the job on the same screen.

Figure 9:
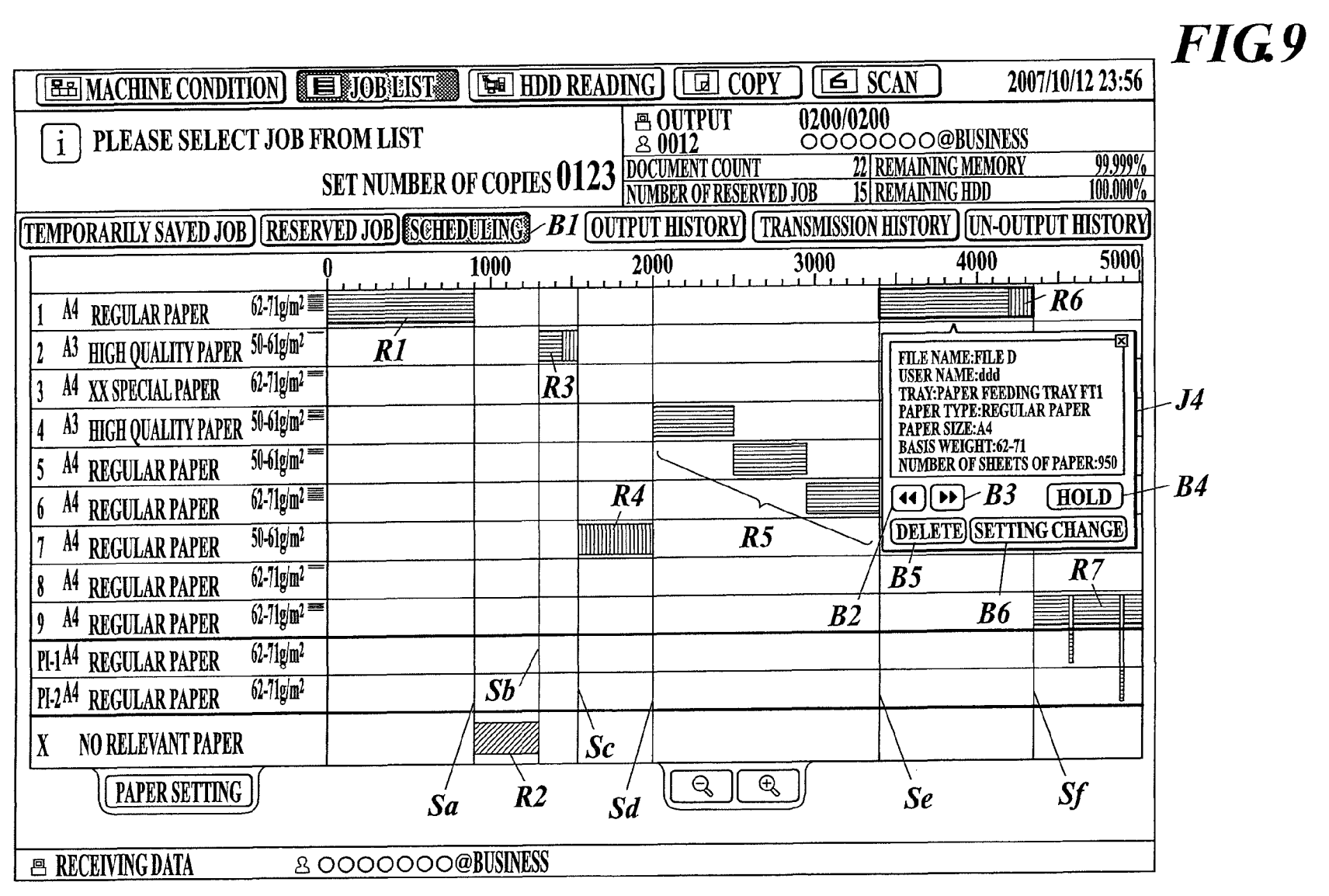

Moreover, in a case where a user selects the reservation information R6 of the job which is sixth in the reserved order of execution having the third stopping cause by operating the touch panel 502 on the job scheduling screen of FIG. 4, the control section 101 displays the job information J4 of the job which is sixth in the reserved order of execution on the job scheduling screen as shown in FIG. 9 based on the setting information of the job stored in the non-volatile memory 104.

The job information J4 of the job which is sixth in the reserved order of execution displayed in the job scheduling screen of FIG. 9 shows the file name "file D", the user name "d d d", the tray setting information "paper feeding tray FT1", the paper type "regular paper", the paper size "A4" and the basis weight "62-71 g/m²" as the paper setting information and the number of sheets of paper planed to be used "950 sheets" in the pop-up cell.

Moreover, as described above, the reservation information R6 of the job is displayed in two colors of the first color and the third color indicating that the remaining amount of paper in the set tray or in the tray which is selected based on the setting of paper is insufficient. Therefore, a user can easily recognize that the image forming process will stop during the process because the paper in the set tray or in the tray which is selected based on the setting of paper is not enough. Further, the insufficient amount which is "150 sheets" can be recognized by the length of the area displayed in the third color in the second axis direction within the reservation information R6. Moreover, by the job information J4, a user can confirm the file name, the user name, the tray setting information, the paper setting information and the number of sheets of paper planed to be used of the job to promptly carry out an appropriate approach not to stop the job which is sixth in the reserved order of execution.

Moreover, in the job scheduling screen of FIG. 9, the operation buttons B2 to B6 for carrying out the execution change operation of the job which is sixth in the reserved order of execution are displayed in the pop-up cell along with the job information J4 which is displayed by selecting the reservation information R6. When the operation buttons B2 to B6 are operated by the touch panel 502 on the job scheduling screen of FIG. 9, the control section 101 executes the execution change process according to the operated operation button to the job which is sixth in the reserved order of execution.

Therefore, a user can confirm the file name, the user name, the tray setting information, the paper setting information and the number of sheets of paper planed to be used of the job which is sixth in the reserved order of execution having the third stopping cause on the job scheduling screen, and then a user can promptly carry out an appropriate execution changing operation corresponding to the job on the same screen.

Figure 10:
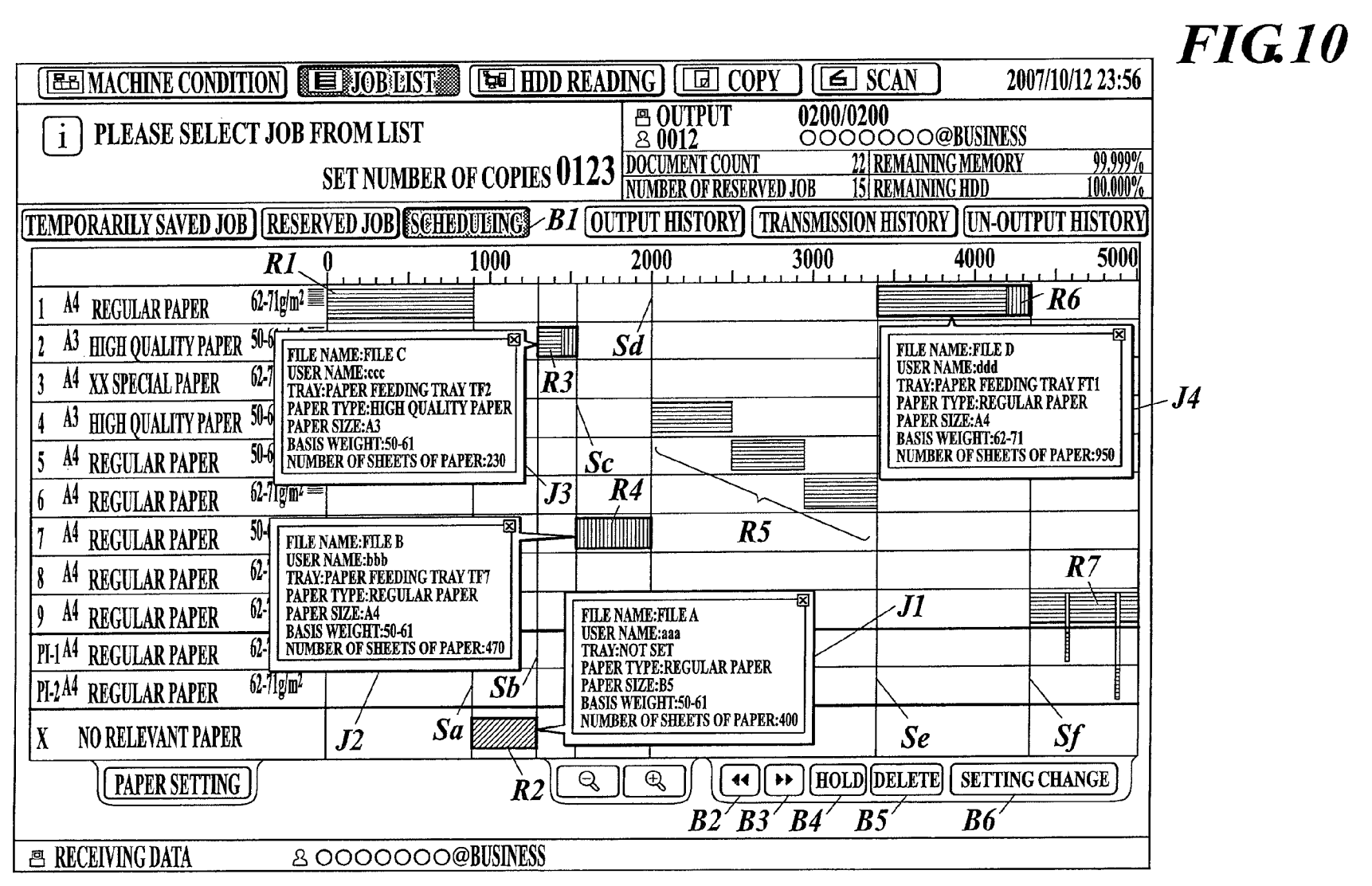

Here, as shown in the job scheduling screen of FIG. 10, the control section 101 may display the job information J1 to J4 of all of the jobs having stopping cause from the beginning at the time when the job scheduling screen is displayed.

Moreover, as shown in FIG. 10, the operation buttons B2 and B3 for carrying out changing of reserved order of execution of the selected job, the operation button B4 for holding the execution of the selected job, the operation button B5 for deleting the selected job and the operation button B6 for changing the setting condition of the selected job are displayed at the bottom-right area of the screen in the job scheduling screen. After a user selecting the reservation information R of the targeted job on the touch panel 502, a user operates the operation buttons B2 to B6. When the job is selected and when the operation buttons B2 to B6 are operated by the touch panel 502, the control section 101 executes the execution change process according to the operated operation button, that is, any of changing of reserved order of execution of the job, holding of the job, deleting of the job, changing to the setting condition of the job to the selected job.

Moreover, the control section 101 may display the job information of all of the jobs having stopping cause and the operation buttons B2 to B6 corresponding to each of the jobs having the stopping cause from the beginning at the time when the job scheduling screen is displayed (omitted from the drawing).

Moreover, in a case where the tray setting change button 504 is operated in a state where the job scheduling screen in which the reservation information R1 to R7 of a plurality of reserved jobs are displayed is displayed in the display section 501, the control section 101 displays the setting change screen G for carrying out the setting change of the paper feeding trays Ft1 to Ft9 on the job scheduling screen.

Figure 11:
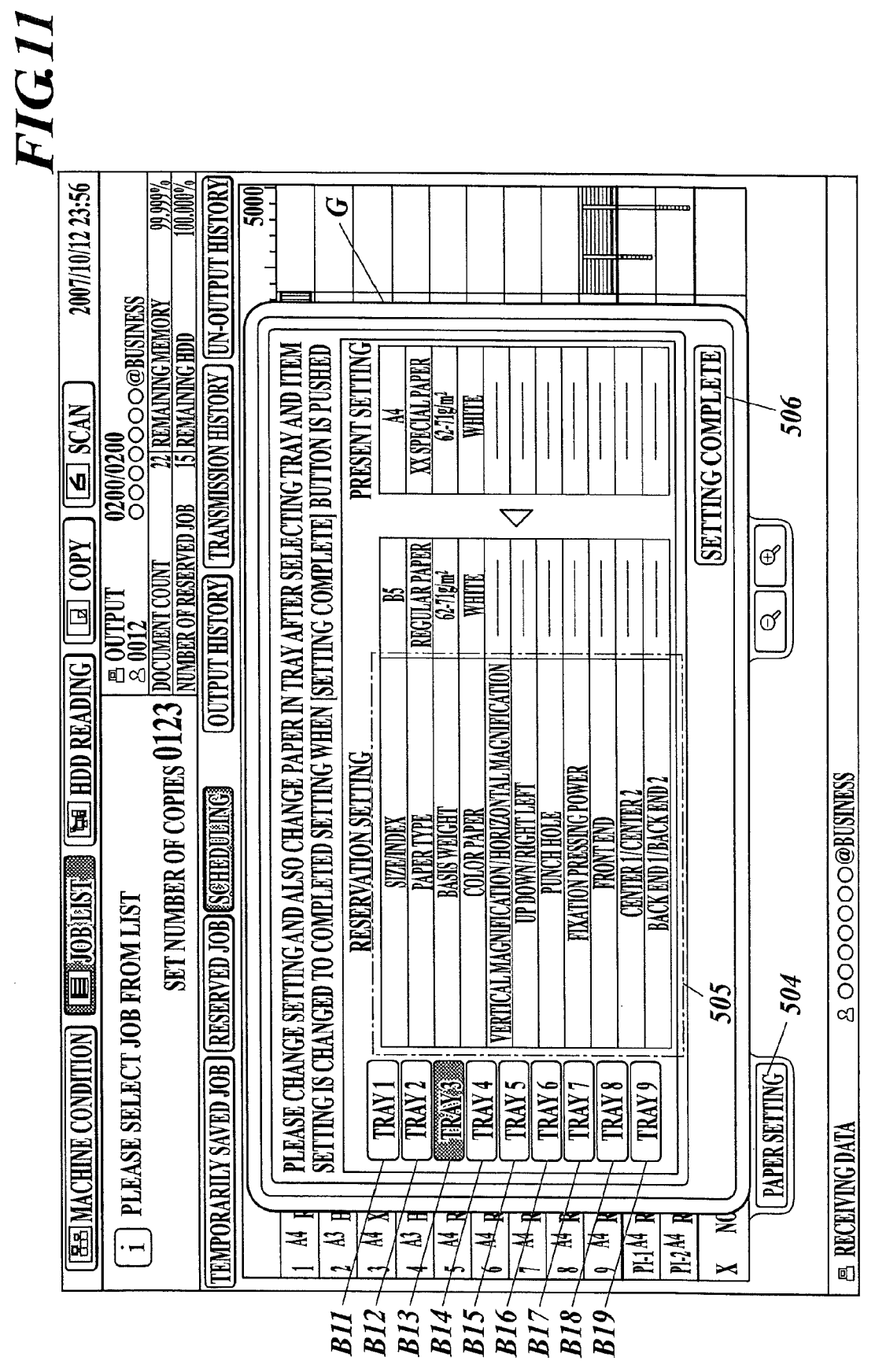

In FIG. 11, the setting change screen G which is displayed on the job scheduling screen is shown.

The setting change screen G comprises the tray selecting button for selecting the paper feeding tray FT1 to FT9 in which the setting change is desired to be carried out and the tray information selecting button 505 for selecting the tray information in the setting change is desired to be carried out.

For example, in a case where a user operates the tray selecting button B13 for selecting "tray 3" on the setting change screen G of FIG. 11, the tray information of the paper which is presently stored in the paper feeding tray FT3 is displayed as the "present setting". Next, in a case where a user changes the tray information by operating the tray information selecting button 505 on the setting change screen G of FIG. 11, the tray information after the change is displayed as the "reservation setting".

The control section 101 determines whether the tray information which is changed in the setting change screen G matches with the paper which is actually stored in each of the paper feeding trays FT1 to FT9 or not by the detection sensors D of each of the paper feeding trays FT1 to FT9. When the setting complete button 506 in the setting change screen G is operated in a state where the changed tray information does not match with the paper actually stored, the operation is not accepted.

Moreover, when the setting complete button 506 in the setting change screen G is operated in a state where the changed tray information matches with the paper which is actually stored in each of the paper feeding trays FT1 to FT9, the control section 101 rewrites the tray information in the information table 104a for the changed paper feeding tray (for example, paper feeding tray FT3).

Moreover, even when the setting change is carried out in the setting change screen G as described above and when the setting complete button 506 is operated, the control section 101 does not accept the change when at least one of the paper feeding trays FT1 to FT9 is opened and closed.

In such way, by detecting whether the setting change carried out by a user matches with the paper which is actually stored in the paper feeding tray FT3 in which the tray information is changed, error operation can be prevented.

Moreover, the job scheduling screen is not limited to a screen in which the first axis indicates the tray information, and the job scheduling screen may be a screen in which the first axis indicates the paper information (omitted from the drawings). The paper information is information relating to paper which can be set as the paper to be used in the job. In such job scheduling screen, the first axis is divided in rows corresponding to each paper stored in the trays based on the tray-paper information of the tray information table 104a.

In particular, the first axis is constituted with four rows respectively corresponding to the paper of "regular paper, A4, 62-71 g/m$^2$" stored in six trays which are the paper feeding tray FT1, the paper feeding tray FT6, the paper feeding tray FT8, the paper feeding tray FT9 and the post inserters PI1 and PI2, the paper of "regular paper, A4, 50-61 g/m$^2$" stored in two trays which are the paper feeding tray FT5 and the paper feeding tray FT7, the paper of "high quality paper, A3, 50-61 g/m$^2$" stored in two trays which are the paper feeding tray FT2 and the paper feeding tray FT4 and the paper and the paper of "XX special paper, A4, 62-71 g/m$^2$" stored in the paper feeding tray FT3. Further, the paper information on the first axis in the job scheduling screen is linked with the tray-paper information stored in the tray information table 104a. Therefore, when the tray-paper information in the tray information table 104a is changed, the job scheduling screen is also updated.

In the display process of the job scheduling screen, the control section 101 specifies the paper to be used in each jobs based on the tray setting information and the paper setting information as the setting condition of each job stored in the non-volatile memory 104. Then, the control section 101 displays the reservation information R of each job at positions on the first axis corresponding to the specified paper in the job scheduling screen. On the other hand, the control section 101 makes the length of the reservation information R of each job in the second axis direction in the job scheduling screen be in a length corresponding to the number of sheets of paper planed to be used based on the number of sheets of paper planed to be used as the setting condition of each job stored in the non-volatile memory 104. Then, the control section 101 displays the reservation information R of each job at the positions on the first axis corresponding to the paper to be used and at the positions on the second axis for the length corresponding to the number of sheets of paper planed to be used in the job scheduling screen. Further, the control section 101 displays the job information J of the job having a stopping cause and the operation buttons B2 to B6 for carrying out the execution change operation of the job in the job scheduling screen. In such way, by the reservation information R of each job is displayed at the positions on the first axis corresponding to the paper to be used and at the positions on the second axis in the length corresponding to the number of sheets of paper planed to be used in the job scheduling screen, the number of sheets of paper planed to be used for each paper in each job and in the entire jobs can be known. Further, by the job information J of the job having a stopping cause being displayed, the job in which at least a part of the image forming process cannot be carried out and the detail of the job can be known easily. Furthermore, by the operation buttons B2 to B6 for carrying out the execution change operation of the job being displayed on the job scheduling screen, the execution change operation of the job for not stopping the image forming process can be carried out efficiently.

Next, a flow of the job scheduling screen display process will be described with reference to FIGS. 12 and 13.

Here, a case where the job information J of the job having a stopping cause and the operation buttons for carrying out the execution change operation of the job are displayed at the time when the job scheduling screen is displayed will be described.

Figure 12:
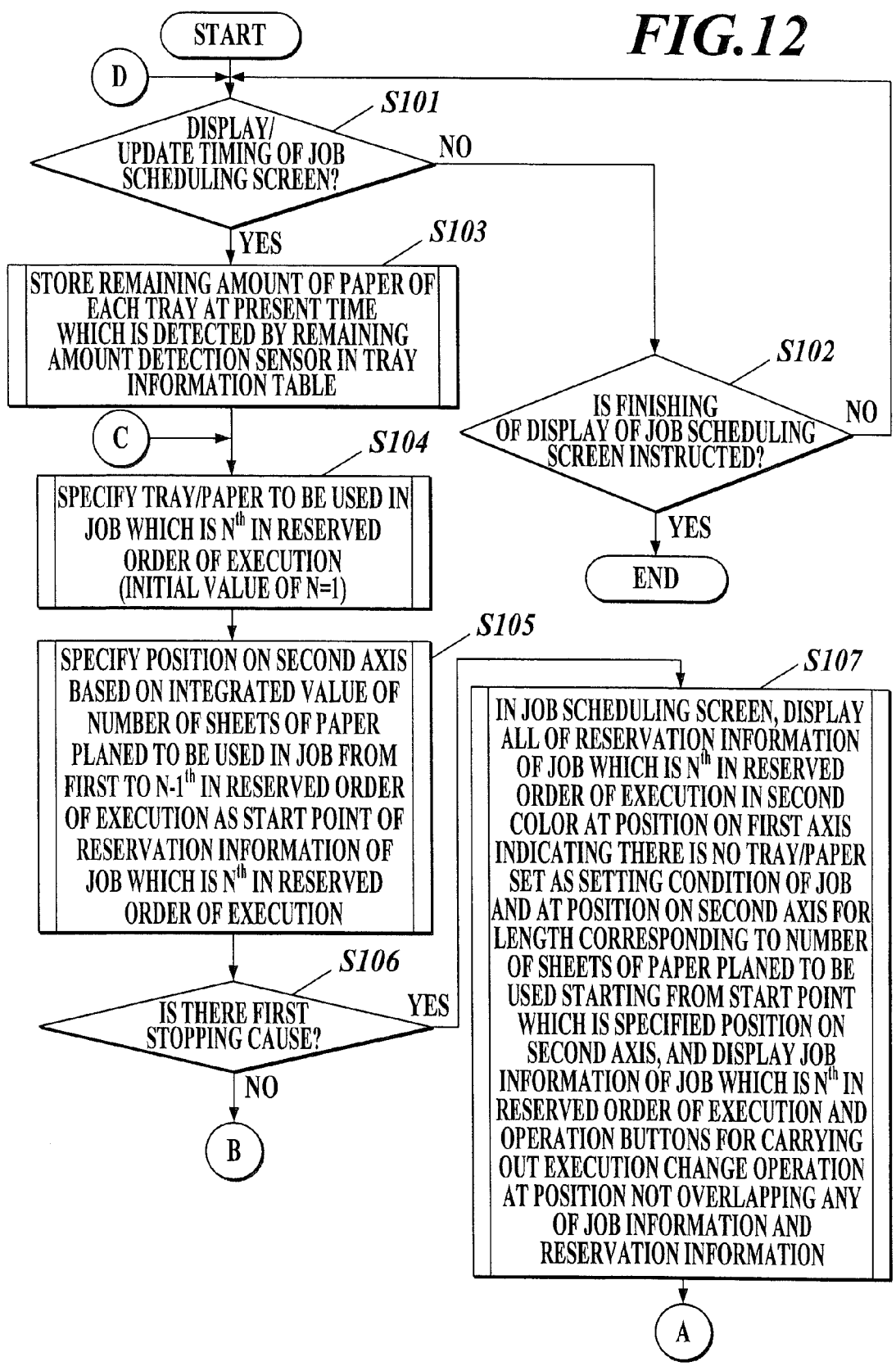
FIG. 12 is a flow chart showing a flow of a job scheduling screen display process.
Figure 13:
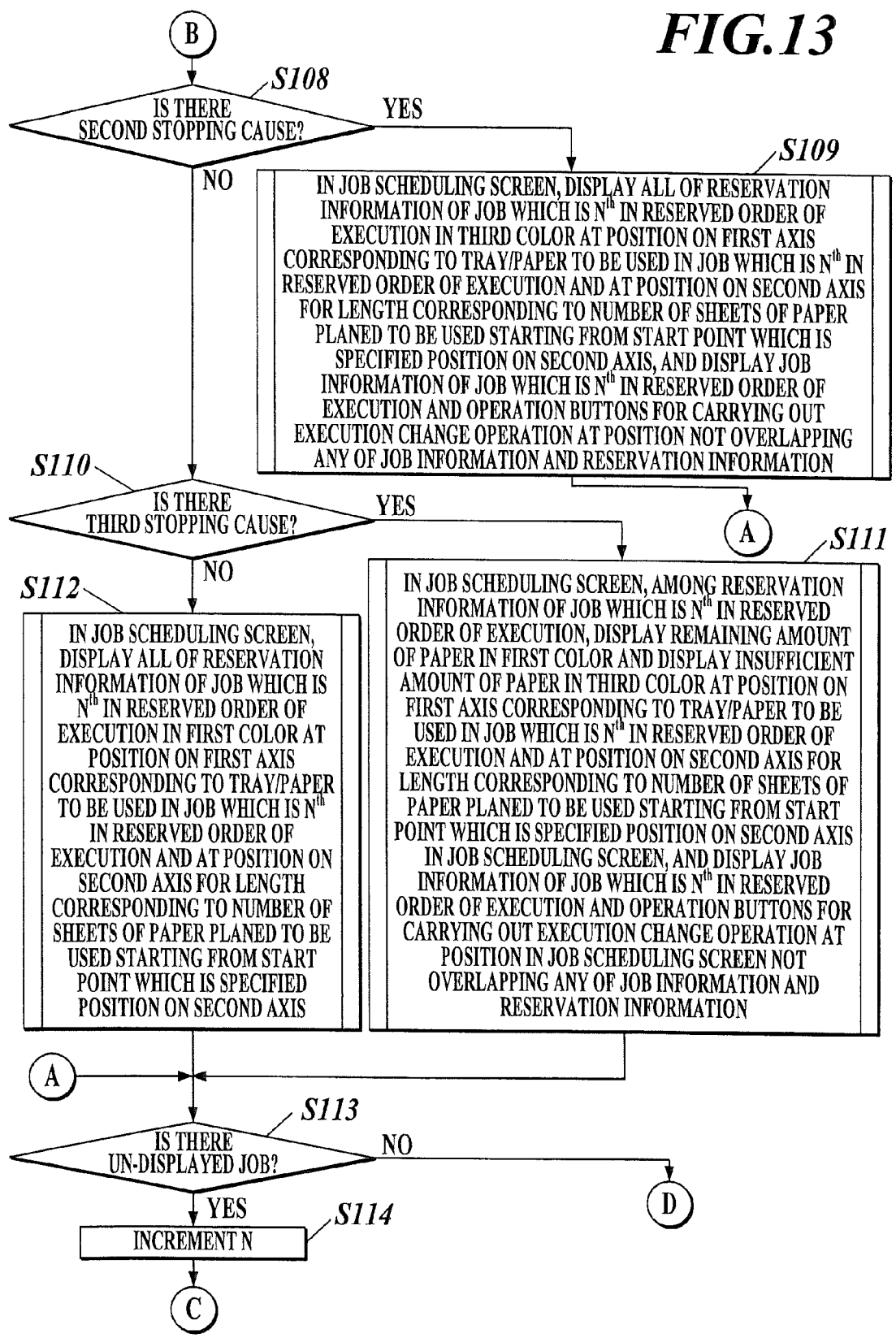
FIG. 13 is a flowchart showing a flow of the job scheduling screen display process.

First, in step S101 of FIG. 12, the control section 101 determines whether it is either one of the display timing based on the display request of the job scheduling screen or the update timing which is set in advance or not. When the control section 101 determines that it is neither of the display timing nor the update timing (step S101; No) in step S101, the control section 101 determines whether there is an instruction to finish the display of the job scheduling screen or not in step S102. When the control section 101 determines that there is an instruction to finish the display of the job scheduling screen (step S102; Yes) in step S102, the process is finished. On the other hand, when the control section 101 determines that there is no instruction to finish the display of the job scheduling screen (step S102; No) in step S102, the process returns to step S101.

On the other hand, when the control section 101 determines that it is either one of the display timing or the update timing (step S101; Yes) in step S101, the control section 101 stores the remaining amount of paper of each tray at the present time which are detected by the remaining amount detection sensors D in the tray information table 104a in the subsequent step S103.

Next, the control section 101 specifies the tray or the paper to be used in the job which is N$^{th}$ in the reserved order of execution (initial value of N=1) based on the tray setting information and the paper setting information of the job in step S104.

Subsequently, the control section 101 calculates the integrated value of the number of sheets of paper planed to be used in the jobs which are from first to N-1$^{th}$ in the reserved order of execution, and specifies the position on the second axis corresponding to the calculated integrated value as the start point of the reservation information R of the job which is N$^{th}$ in the reserved order of execution by setting the origin of the second axis as zero sheets in step S105.

Next, the control section 101 determines whether the job which the $N^{th}$ in the reserved order of execution has the first stopping cause or not based on the tray/paper to be used, the number of sheets of paper planed to be used and the tray-paper information stored in the tray information table 104a of the job which is Nth in the reserved order of execution specified in step S104 in step S106. When the control section 101 determines that the job which is $N^{th}$ in the reserved order of execution does not have the first stopping cause (step S106; No) in step S106, the process proceeds to step S108.

On the other hand, when the control section 101 determines that the job which is $N^{th}$ in the reserved order of execution has the first stopping cause (step S106; Yes) in step S106, the control section 101 displays all of the reservation information R of the job which is $N^{th}$ in the reserved order of execution in the second color at the position on the first axis indicating that the tray/paper set as the setting condition of the job do not exist and on the second axis for a length corresponding to the number of sheets of paper planed to be used starting from the starting point which is the position on the second axis specified in step S105 in the job scheduling screen in the subsequent step S107. Further, the control section 101 displays the job information J of the job which is $N^{th}$ in the reserved order of execution and the operation buttons B2 to B6 for carrying out the execution change operation of the job which is $N^{th}$ in the reserved order of execution at the position not overlapping with any of the job information J and the reservation information R in the job scheduling screen. Then, the process proceeds to step S113.

Next, the control section 101 determines whether the job which is $N^{th}$ in the reserved order of execution has the second stopping cause or not based on the tray/paper to be used, the number of sheets of paper planed to be used and the tray-paper information stored in the tray information table 104a in the job which is $N^{th}$ in the reserved order of execution specified in the step S104 in step S108. When the control section 101 determines that the job which is $N^{th}$ in the reserved order of execution does not have the second stopping cause (step S108; No) in step S108, the process proceeds to step S110.

On the other hand, when the control section 101 determines that the job which is $N^{th}$ in the reserved order of execution has the second stopping cause (step S108; Yes) in step S108, the control section 101 displays all of the reservation information R of the job which is $N^{th}$ in the reserved order of execution in the third color at the position on the first axis corresponding to the tray/paper to be used in the job which is $N^{th}$ in the reserved order of execution specified in step S104 and on the second axis for the length corresponding to the number of sheets of paper planed to be used starting from the start point which is the position on the second axis specified in step S105 in the job scheduling screen in the subsequent step S109. Further, the control section 101 displays the job information J of the job which is $N^{th}$ in the reserved order of execution and the operation buttons B2 to B6 for carrying out the execution change operation on the job which is $N^{th}$ in the reserved order of execution at the position not overlapping with any of the job information J and the reservation information R in the job scheduling screen. Then, the process proceeds to step S113.

Next, the control section 101 determines whether the job which is $N^{th}$ in the reserved order of execution has the third stopping cause or not based on the tray/paper to be used, the number of sheets of paper planed to be used and the tray-paper information stored in the tray information table 104a of the job which is Nth in the reserved order of execution specified in step S104 in step S110. When the control section 101 determines that the job which is $N^{th}$ in the reserved order of execution does not have the third stopping cause (step S110; No) in step S110, the process proceeds to step S112.

On the other hand, when the control section 101 determines that the job which is Nth in the reserved order of execution has the third stopping cause (step S110; Yes) in step S110, the control section displays the remaining amount of paper in the first color and the insufficient amount of paper in the third color within the reservation information R of the job which is $N^{th}$ in the reserved order of execution at the position on the first axis corresponding to the tray/paper to be used in the job which is $N^{th}$ in the reserved order of execution specified in step S104 and on the second axis for the length corresponding to the number of sheets of paper planed to be used starting from the start point which is the position on the second axis specified in step S105 in the job scheduling screen in the subsequent step S111. Further, the control section 101 displays the job information J of the job which is $N^{th}$ in the reserved order of execution and the operation buttons B2 to B6 for carrying out the execution change operation of the job which $N^{th}$ in the reserved order of execution at the position not overlapping with any of the job information J and the reservation information R in the job scheduling screen. Then, the process proceeds to step S113.

Next, in step S112, the control section 101 displays all of the reservation information R of the job which is Nth in the reserved order of execution in the first color at the position on the first axis corresponding to the tray/paper to be used in the job which is $N^{th}$ in the reserved order of execution specified in step S104 and on the second axis for the length corresponding to the number of sheets of paper planed to be used starting from the start point which is the position on the second axis specified in step S105 in the job scheduling screen, and the process proceeds to step S113.

Next, in step S113, the control section 101 determines whether there are un-displayed jobs in the jobs which can be displayed on the job scheduling screen or not. When the control section 101 determines that there is a un-displayed job (step S113; Yes) in step S113, the control section 101 increments N in the subsequent step S114, and the process returns to step S104.

On the other hand, when the control section 101 determines that a un-displayed job does not exist (step S113; No) in step S113, the process returns to step S101.

Next, a flow of the setting change process of the paper feeding trays FT1 to FT9 will be described with reference to FIG. 14.

Here, this process can be executed at all time while the job scheduling screen is displayed in the display section 501.

Figure 14:
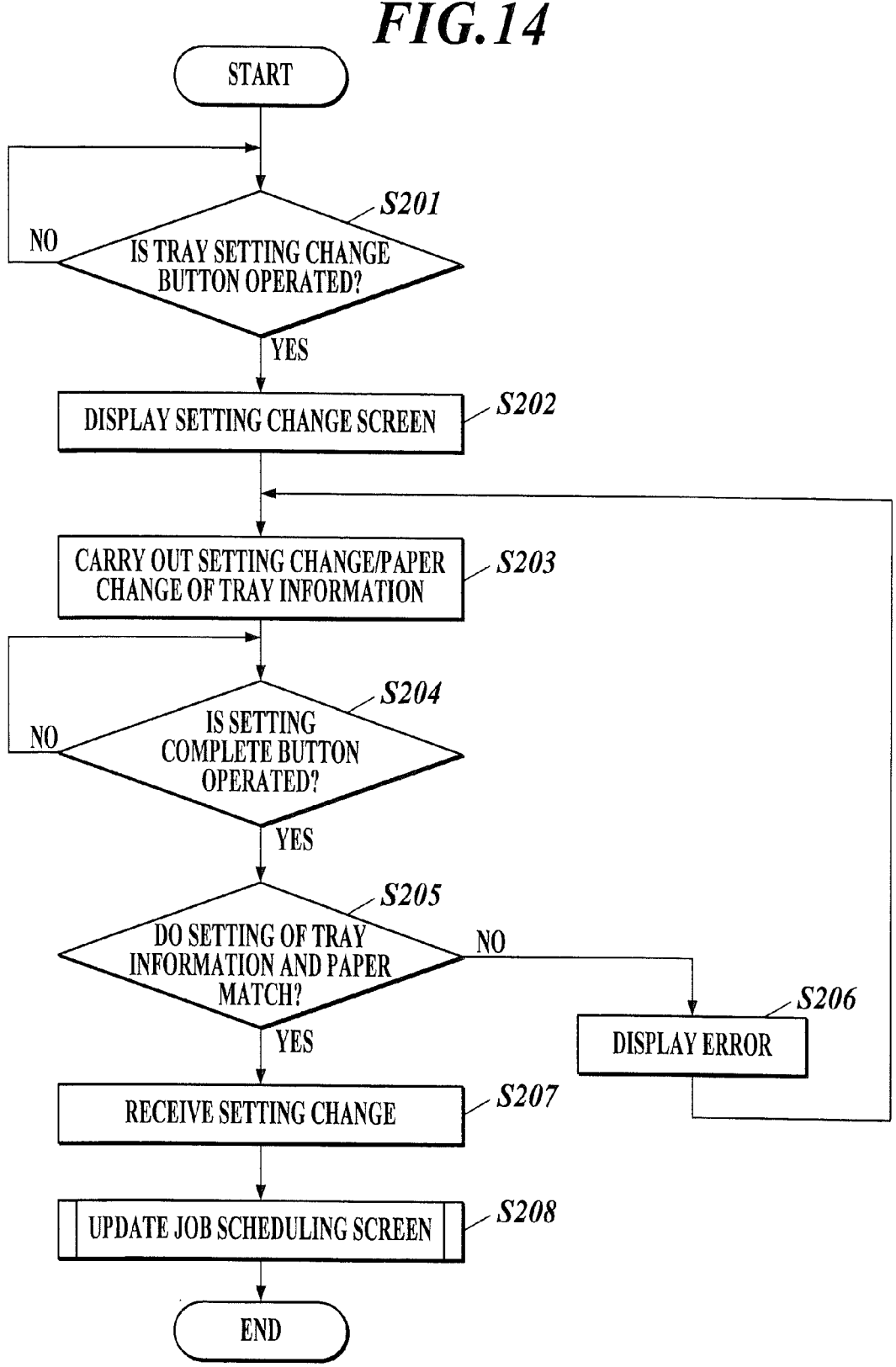
FIG. 14 is a flowchart showing a flow of a setting changing process of a paper feeding tray.

First, in step S201 of FIG. 14, the control section 101 determines whether the tray setting change button 504 is operated or not. When the control section 101 determines that the tray setting change button 504 is not operated (step S201; No) in step S201, the process returns to step S201.

On the other hand, when the control section 101 determines that the tray setting change button 504 is operated (step S201; Yes) in step S201, the control section 101 displays the setting change screen G on the job scheduling screen displayed in the display section 501 in the subsequent step S202.

Next, in step S203, the paper feeding tray in which the setting is to be changed (for example, paper feeding tray FT3) is selected by a user and the setting of the tray information of the paper feeding tray FT3 is changed. Further, the paper stored in the paper feeding tray FT3 in which the setting is changed is changed by a user.

Next, the step S204, the control section 101 determines whether the setting complete button 506 is operated or not. When the control section 101 determines that the setting complete button 506 is not operated (step S204; No) in step S204, the process returns to step S204.

On the other hand, when the control section 101 determines that the setting complete button 506 is operated (step S204; Yes) in step S204, the control section 101 determines whether the paper which is actually stored in the paper feeding tray FT3 in which the setting is changed matches with the tray information in which the setting is changed by a user or not in the subsequent step S205. When the control section 101 determines that the paper stored in the paper feeding tray in which the setting is changed does not match with the tray information in which the setting is changed (step S205; No) in step S205, the control section 101 displays letters of "error" in the display section 501 for announcing to a user that the paper actually stored in the paper feeding tray FT3 in which the setting is changed does not match with the tray information in which the setting is changed, and the process returns to the above described step S203. Here, a warning sound may be made instead of displaying the letters of "error".

On the other hand, when the control section 101 determines that the paper stored in the paper feeding tray in which the setting is changed matches with the tray information in which the setting is changed (step S205; Yes) in step S205, the control section 101 accepts the setting change which is carried out in the above described step S203 in the subsequent step S207.

Next, the control section 101 updates the job scheduling screen in step S208, and the process is finished.

As described above, according to the image forming apparatus 1 of the embodiment, the reservation information R for the length in the second axis corresponding to the number of sheets of paper planed to be used in each of the reserved jobs are displayed at the positions on the first axis corresponding to the tray or the paper to be used in each of the jobs on the two dimensional chart in which the first axis indicates the tray information or the paper information and in which the second axis indicates the number of sheets of paper planed to be used, and also the job information J of the job having the stopping cause which stops at least a part of the image forming process are displayed in the job scheduling screen displayed in the display section 501. Therefore, the detail of the job having the stopping cause can be easily known in the job scheduling screen displayed in the display section 501. Thus, an appropriate approach for not stopping the image forming process according to each job can be easily carried out.

Further, because the file name, the user name and the setting condition of the job are displayed as the job information J, the file name, the user name and the setting condition of the job having a stopping cause can be recognized in the job scheduling screen displayed in the display section 501.

Moreover, the setting condition of the job includes the tray setting information, the paper setting information and the number of sheets of paper planed to be used, and the paper setting information includes paper type, paper size and basis weight. Therefore, information relating to the setting of the tray to be used in the job, information relating to paper type, paper size and basis weight of the paper and the number of sheets of paper planed to be used can be recognized in the job scheduling screen displayed in the display section 501. Thus, from these information, an appropriate approach for not stopping the image forming process according to each job can be carried out more promptly.

Further, because the control section 101 displays the job information J at the position not overlapping with the reservation information R or other job information J in the job scheduling screen, the job information J and the reservation information R of each job are displayed so as not to be hidden under the other job information J or reservation information R, and further, all of the job information J and reservation information R displayed in the job scheduling screen can be confirmed at once.

Furthermore, when the reservation information R of the job having a stopping cause is not selected by the touch panel 502 in the job scheduling screen, the control section 101 displays the job information J relating to the job. Therefore, it is convenient because only the job information J of an arbitrary job among jobs having stopping causes can be displayed.

Further, the stopping cause includes the first stopping cause which does not have the tray information matching with the tray setting information and the paper setting information, the second stopping cause which has the tray information matching with the tray setting information and the paper setting information and in which the remaining amount of paper in the tray is zero and the third stopping cause which has the tray information matching with the tray setting information and the paper setting information and in which the remaining amount of paper in the tray will be zero during the execution of the job. The control section 101 displays the reservation information R relating to the job having a stopping cause in the job scheduling screen in a state according to each of the stopping causes. In such way, it can be easily known that each of the jobs having a stopping cause has which of the first stopping cause, the second stopping cause and the third stopping cause, and an appropriate operation for not stopping the image forming process can be carried out.

Moreover, the control section 101 updates the display position of the reservation information R in the job scheduling screen by setting the origin of the second axis as the present point at a predetermined update timing. Therefore, the number of sheets of paper planed to be used in each of the reserved jobs at the predetermined update timing can be known for each of the tray information/paper information.

Further, the predetermined update timing is when the image forming process to a predetermined number of sheets of paper is finished or when a predetermined time has passed since the previous update timing. Therefore, the number of sheets of paper planed to be used in each of the reserved jobs at the present point can be known for each of the tray information and paper information every time the image forming process is carried out to the predetermine number of sheets of paper or every time the predetermined time has passed.

Furthermore, the job scheduling screen in which the reservation information R for the length corresponding to the number of sheets of paper planed to be used in each of the reserved jobs in the second axis is displayed at the position on the first axis corresponding to the tray or paper to be used in each of the jobs in the two dimensional chart in which the first axis shows the tray information or the paper information and in which the second axis shows the number of sheets of paper planed to be used in the display section 501. Therefore, the number of sheets of paper planed to be used in a plurality of reserved jobs can be recognized in advance for each of the tray information and/or paper information. Further, because the execution change operation of the job so as not to stop the image forming process can be carried out on the job scheduling screen, an efficient execution change process of the job can be carried out.

Furthermore, the execution change process of the job includes changing of the reserved order of execution of the job, holding of the job, deleting of the job and changing of setting condition of the job. Therefore, operation for instructing the changing of reserved order of execution of the job, the deleting of the job, the holding of the job and the changing of the setting condition of the job can be carried out on the job scheduling screen in the display section 501.

Moreover, because the job information J relating to jobs having stopping causes are displayed in the job scheduling screen, the job information J of the jobs having stopping causes can be easily recognized on the job scheduling screen in the display section 501, and further the execution change operation is to be carried out by the operation buttons B2 to B6 in the job scheduling screen. Thus, an appropriate execution change operation of the job according to each of the jobs having stopping causes can be carried out more efficiently.

Further, only when the reservation information R of the job having a stopping cause is selected by the touch panel 502 in the job scheduling screen, the job information J of the job having the stopping cause is displayed. In such way, it is convenient because only the job information J of an arbitrary job among the jobs having stopping causes can be displayed.

Furthermore, it is convenient because the operation buttons B2 to B6 are displayed in the job scheduling screen only when the reservation information R of the job having the stopping cause is selected by the touch panel 502 in the job scheduling screen.

Moreover, by displaying the relations between the paper feeding trays (paper feeding trays FT1 to FT9, post inserters PI1 and PI2), the tray information for each of the paper feeding trays and the reservation information R1 to R7 of the jobs so as to be able to know at glance, the setting of each of the paper feeding trays can be known in advance and an instruction to display the setting change screen G of the paper feeding trays can be given on the job scheduling screen. Therefore, the setting change of the paper feeding trays can be carried out promptly and the apparatus can be operated efficiently.

Further, when the setting change screen G is displayed on the job scheduling screen, the setting of the tray information including paper type, paper size, basis weight and remaining amount of the paper stored in each of the paper feeding trays FT1 to FT9 can be changed.

Furthermore, the order of execution of a plurality of jobs, the paper to be used in each job and the paper feeding tray in which the paper to be used is stored can be know at glance in the job scheduling screen.

Moreover, by providing "no relevant paper" in the first axis in the job scheduling screen, the existence of the job which does not have the tray information matching with the tray information planed to be used can be recognized.

Further, when the remaining amount detected by the remaining amount detection section is less than the number of sheets of paper planed to be used in the job, the insufficient amount of paper is displayed in the reservation information Rn of the job in the job scheduling screen so that the display region for the length in the second axis direction corresponding to the insufficient amount of paper among the display region of the reservation information Rn is displayed differently from the other display region. Therefore, the insufficient amount of the paper to be used can be known for each of the reserved jobs.

Furthermore, the job scheduling screen is updated at a predetermined update timing. Therefore, the number of sheets of paper planed to be used and the insufficient amount of paper of each of the reserved jobs at the present point can be known for each tray information at every predetermined update timing.

In particular, the number of sheets of paper planed to be used in each of the reserved jobs can be know for each tray information every time the setting change of the tray information is carried out, every time the image forming process is carried out to a predetermined number of sheets of paper or every time when a predetermined time has passed.

Here, scope of the present invention is not limited to the above described embodiment, and various modifications and changes in design can be carried out within the scope to the present invention.

For example, in the above embodiment, the vertical axis in the job scheduling screen is made to be the first axis and the horizontal axis thereof is made to be the second axis. However, the direction of the first axis and the second axis may be inversed.

Further, in the above embodiment, the reservation information R of each job are displayed at positions where the numbers of sheets of paper planed to be used in the jobs which come before in the reserved order of execution is integrated. However, the reservation information R of each job may be displayed at the positions where the original point of the second axis is the start point. Furthermore, in such case, the integrated value of the number of sheets of paper planed to be used in each tray information or in each paper information may be indicated by displaying the reservation information R at the position where the numbers of sheets of paper planed to be used of the jobs which come before in the reserved order of execution having the same tray information or the paper information are integrated.

Furthermore, when there are both of the tray setting information and paper setting information, that is, when tray and paper are set as the setting condition of the job and also when the paper stored in the set tray and the set paper are different from one another, it can be determined that the job has a stopping cause.

Moreover, in the above embodiment, file name, user name, tray setting information, paper setting information and number of sheets of paper planed to be used of the job are displayed as the job information J displayed in the job scheduling screen. However, there is no need to display all of the information, and it is sufficient that any one of the information is displayed. Further, other information may be displayed as the job information J.

Further, in the above embodiment, when there is the tray-paper information which match with the tray setting information and the paper setting information which are set as the setting condition of the job, it is determined that when the remaining amount of paper in the tray is zero, the first stopping cause is relevant. On the other hand, when the remaining amount of paper becomes zero during the execution of the job, it is determined that the second stopping cause is relevant. However, when the remaining amount of paper in the tray is less than the number of sheets of paper planed to be used, all the cases regardless of whether the remaining amount of paper in the tray is zero or 1 or more may be determined as being relevant to a stopping cause.

Moreover, in the embodiment, it is described that the tray setting change button 504 and the setting complete button 506 are provided on the job scheduling screen and the setting change screen G. However, the tray setting change button 504 and the setting complete button 506 may be keys provided in the operation display section 500 in advance.

According to a first aspect of the preferred embodiment of the present invention, there is provided an image forming apparatus, comprising a reservation section to reserve a plurality of jobs, an image forming section to execute an image forming process according to the jobs reserved by the reservation section, a control section to display a job scheduling screen in a display section, the job scheduling screen having reservation information of each of the jobs which are reserved displayed in a two dimensional chart in which a first axis indicates tray information or paper information and in which a second axis indicates the number of sheets of paper planed to be used or an estimated execution time and a storage section to store tray-paper information relating to a paper of each of trays, and the control section specifies a tray or a paper to be used in each of the jobs based on a setting condition of each of the jobs which are reserved and displays the reservation information for a length corresponding to the number of sheets of paper planed to be used in each of the jobs in the second axis at a position on the first axis corresponding to the tray or the paper which is specified and the control section determines whether a job having a stopping cause which stops at least a part of the image forming process is reserved or not based on a setting condition and the tray-paper information of each of the jobs which are reserved, and the control section displays job information relating to the job having the stopping cause in the job scheduling screen when determining that the job having the stopping cause is reserved.

In accordance with a first aspect of the present invention, detail of the job having a stopping cause can be easily known in the job scheduling screen displayed in the display section. Therefore, an appropriate approach for not stopping the image forming process according to each of the jobs can be carried out easily.

Preferably, the control section displays at least one among a file name, a user name and a setting condition of a job as the job information.

Further, it is needless to say that the above advantages can be obtained, and also at least one of file name, user name, setting condition of the job having a stopping cause can be recognized in the job scheduling screen displayed in the display section.

Preferably, the setting condition of the job includes tray setting information, paper setting information and the number of sheets of paper planed to be used, and the paper setting information includes at least one of a paper type, a paper size and a basis weight.

Further, it is needless to say that the above advantages can be obtained, and also information relating to setting of the tray to be used in the job, information relating to setting of at least on of paper type, paper size and basis weight of the paper and the number of sheets of paper planed to be used can be recognized in the job scheduling screen displayed in the display section. Therefore, from the information, an appropriate approach for not stopping the image forming process according to each of the jobs can be carried out more promptly.

Preferably, the control section displays the job information in the job scheduling screen at a position not overlapping with any of the reservation information and the job information.

Further, it is needless to say that the above advantages can be obtained, and also the job information and the reservation information of each of the jobs are displayed without being hidden under other job information or reservation information. Therefore, all of the job information and the reservation information displayed in the job scheduling screen can be recognized at once.

Preferably, the image forming apparatus further comprises a selecting section to select the reservation information in the job scheduling screen, and when the reservation information of the job having the stopping cause is selected by the selecting section in the job scheduling screen, the control section displays the job information relation to the job.

Further, it is needless to say that the above advantages can be obtained, and also it is convenient because only the job information of an arbitrary job among the jobs having stopping cause can be displayed.

Preferably, the stopping cause includes a first stopping cause which does not have the tray information matching with tray setting information and paper setting information, the second stopping cause which has the tray information matching with the tray setting information and the paper setting information and in which a remaining amount of paper in the tray is zero and the third stopping cause which has the tray information matching with the tray setting information and the paper setting information and in which the remaining amount of paper in the tray becomes zero while the job is in execution, and the control section displays the reservation information relating to the job having the stopping cause in the job scheduling screen in a state corresponding to each stopping cause.

Further, it is needless to say that the above advantages can be obtained, and also each of the jobs having a stopping cause has which of the first stopping cause, the second stopping cause and the third stopping cause can be easily known. Therefore an appropriate approach for not stopping the image forming process can be carried out.

Preferably, the control section updates a display position of the reservation information in the job scheduling screen by setting an origin of the second axis as a present point at a predetermined update timing.

Further, it is needless to say that the above advantages can be obtained, and also the number of sheets of paper planed to be used at the present point of each of the reserved jobs at the predetermined update timing can be known for each of the tray information/paper information.

Preferably, the predetermined update timing is when the image forming process to a predetermined number of sheets of paper is finished or when a predetermined time has passed since a previous update timing.

Further, it is needless to say that the above advantages can be obtained, and also the number of sheets of paper planed to be used at the present point in each of the reserved jobs can be known for each of the tray information and paper information every time when the image forming process to a predetermined number of sheets of paper is carried out or every time when a predetermined time has passed.

According to a second aspect of the preferred embodiment of the present invention, there is provided an image forming apparatus comprising a reservation section to reserve a plurality of jobs, an image forming section to execute an image forming process according to the jobs reserved by the reservation section, a control section to display a job scheduling screen in a display section, the job scheduling screen having reservation information of each of the job which are reserved displayed in a two dimensional chart in which a first axis indicates tray information or paper information and in which a second axis indicates the number of sheets of paper planed to be used or an estimated execution time and an operation section to carry out an execution change operation of a job on the job scheduling screen, and the control section specifies a tray or a paper to be used in each of the jobs based on a setting condition of each of the jobs which are reserved and displays the reservation information for a length corresponding to the number of sheets of paper planed to be used in each of the jobs in the second axis at a position on the first axis corresponding to the tray or the paper which is specified, and the control section carries out an execution change process corresponding to the execution change operation carried out by the operation section.

In accordance with the second aspect of the present invention, the number of sheets of paper planed to be used in a plurality of reserved jobs can be easily recognized for each of the tray information and/or paper information in the job scheduling screen displayed in the display section, and also the execution change operation for not stopping the image forming process can be carried out on the job scheduling screen. Therefore, an efficient execution change operation of the jobs can be carried out.

Preferably, the execution change process of the job includes at least one among a changing of a reserved order of execution of the job, a holding of the job, a deleting of the job and a changing of the setting condition of the job.

Further, it is needless to say that the above advantages can be obtained, and also an instruction to execute at least one of changing of the reserved order of execution of the job, deleting of the job, holding of the job and changing to the setting condition of the job can be carried out on the job scheduling screen in the display section.

Preferably, the operation section comprises an operation button in the job scheduling screen, and the control section determines whether a job having a stopping cause which stops at least a part of the image forming process is reserved or not based on the setting condition and tray-paper information of each of the jobs which are reserved, and the control section displays job information relating to the job having the stopping cause and carries out the execution change process corresponding to the execution change operation of the operation button when the control section determines that the job having the stopping cause is reserved.

Further, it is needless to say that the above advantages can be obtained, and also detail of the job having the stopping cause can be easily known and the execution change operation of the job according to each of the jobs having a stopping cause can be carried out more efficiently.

Preferably, the image forming apparatus further comprises a selecting section to select the reservation information in the job scheduling screen, wherein when reservation information of the job having the stopping cause is selected by the selecting section in the job scheduling screen, the control section displays the job information of the job having the stopping cause.

Further, it is needless to say that the above advantages can be obtained, and also it is convenient because only the job information of an arbitrary job among the jobs having a stopping cause can be displayed in the job scheduling screen.

Preferably, the control section displays the operation button in the job scheduling screen when the reservation information of the job having the stopping cause is selected by the selecting section in the job scheduling screen.

Further, it is needless to say that the above advantages can be obtained, and also it is convenient because the operation buttons for carrying out the execution change operation of the job are displayed in the job scheduling screen only when the reservation information of the job having a stopping cause is selected.

According to a third aspect of the preferred embodiment of the present invention, there is provided an image forming apparatus comprising a reservation section to reserve a plurality of jobs, an image forming section to execute an image forming process according to the jobs reserved by the reservation section, a plurality of paper feeding trays, a control section to display a job scheduling screen in a display section, the job scheduling screen having reservation information of each of the jobs which are reserved displayed in a two dimensional chart in which a first axis indicates tray information for each of the paper feeding trays and in which a second axis indicates an estimated execution time or the number of sheets of paper planed to be used of a job, a first operation section to give an instruction to display a setting change screen for changing a setting of the tray information in a state where the job scheduling screen is displayed in the display section and a second operation section to give an instruction to change a setting of the tray information in the setting change screen, and the control section specifies a paper feeding tray to be used in each of the jobs based on the setting information of each of the jobs which are reserved, displays the reservation information at a position on the first axis corresponding to the specified paper feeding tray and on the second axis for a length corresponding to the estimated execution time or the number of sheets of paper planed to be used of each of the jobs, displays the setting change screen in the display section when the first operation section is operated and carries out a setting change of the tray information when the setting change of the tray information is instructed by the second operation section.

In accordance with the third aspect of the present invention, the setting of the paper feeding tray can be known in advance by displaying the relations between the paper feeding trays, the tray information of each of the paper feeding trays and the jobs so as to be recognized at a glance. Further, because an instruction to display the setting change screen of the paper feeding trays can be given on the job scheduling screen, the setting change of the paper feeding trays can be carried out promptly and the apparatus can operate efficiently.

Preferably, the tray information includes at least one among a type, a size, a basis weight and a remaining amount of a paper stored in the paper feeding tray.

Accordingly, the setting of the tray information including the type, size, basis weight and remaining amount of the paper stored in the paper feeding tray can be changed in the setting change screen.

Preferably, the job scheduling screen comprises a display column to display the reservation information of a job which does not have the tray information matching with the setting information of the job in the first axis, and the control section displays the reservation information of the job which does not have the tray information matching with the setting information of the job in the display box.

Accordingly, it can be recognized that the job which does not have the tray information matching with the tray information planed to be used exists in the job scheduling screen.

Preferably, when the control section displays the reservation information of the plurality of jobs, the control section displays a relevant reservation information at a position corresponding to the tray information matching with the setting information of each of the jobs in a reserved order of execution of each of the jobs by setting an origin of the second axis as a present point.

Accordingly, the reserved order of the plurality of jobs, the paper to be used in each job and the paper feeding tray which stored the paper can be known in a glance in the job scheduling screen.

Preferably, the control section updates a display position of the reservation information in the job scheduling screen by setting an origin of the second axis as a present point at a predetermined update timing.

Accordingly, the relations between the reserved order of execution of the plurality of jobs, the paper to be used in each job and the paper feeding tray which stores the paper can be known at every predetermined update timing.

Preferably, the predetermined update timing is any one of when the setting change of the tray information is carried out, when the image forming process to a predetermined number of sheets of paper is finished and when a predetermined time has passed since a previous update timing.

Accordingly, the relations between the reserved order of execution of the plurality of jobs, the paper to be used in each job and the paper feeding tray which stores the paper can be known every time when the setting change of the tray information is carried out, every time when the image forming process is carried out to a plurality of sheets of paper and every time a predetermined time has passed.

Preferably, the image forming apparatus further comprises a remaining amount detection section to detect a remaining amount of a paper stored in the tray, and when the remaining amount detected by the remaining amount detection section is less than the number of sheets of paper planed to be used in the job, the control section displays an insufficient amount of paper by displaying a display region for a length corresponding to the insufficient amount of paper by displaying a display region for a length corresponding to the insufficient amount of paper in a second axis direction so as to be different from other display region within a display region of the reservation region in the reservation information of the job in the job scheduling screen.

Accordingly, the insufficient amount of the paper to be used can be known for each of the reserved jobs.

The present U.S. patent application claims the priority of Japanese Patent Application No. 2008-211365 filed on Aug. 20, 2008, Japanese Patent Application No. 2008-215223 filed on Aug. 25, 2008 and Japanese Patent Application No. 2008-215236 filed on Aug. 25, 2008 according to the Paris Convention, and the above Japanese Patent Applications are the basis for correcting mistranslation of the present U.S. patent application.

What is claimed is:

1. An image forming apparatus, comprising:
   a reservation section to reserve a plurality of jobs;
   an image forming section to execute an image forming process according to the jobs reserved by the reservation section;
   a control section to display a job scheduling screen in a display section, the job scheduling screen having reservation information of each of the jobs which are reserved displayed in a two dimensional chart in which a first axis indicates tray information or paper information and in which a second axis indicates the number of sheets of paper planned to be used or an estimated execution length of time; and
   a storage section to store tray-paper information relating to a paper of each of a plurality of trays, wherein
   the control section specifies a tray or a paper to be used in each of the jobs based on a setting condition of each of the jobs which are reserved and displays the reservation information for a value corresponding to the number of sheets of paper planned to be used or an estimated execution length of time of each of the jobs in the second axis at a position on the first axis corresponding to the tray or the paper which is specified, and
   the control section determines whether a job having a stopping cause which stops at least a part of the image forming process is reserved or not based on a setting condition and the tray-paper information of each of the jobs which are reserved, and the control section displays job information relating to the job having the stopping cause in the job scheduling screen when determining that the job having the stopping cause is reserved.

2. The image forming apparatus of claim 1, wherein the control section displays at least one among a file name, a user name and a setting condition of a job as the job information.

3. The image forming apparatus of claim 2, wherein the setting condition of the job includes tray setting information, paper setting information and the number of sheets of paper planned to be used, and the paper setting information includes at least one of a paper type, a paper size and a basis weight.

4. The image forming apparatus of claim 1, wherein the control section displays the job information in the job scheduling screen at a position not overlapping with any of the reservation information and the job information.

5. The image forming apparatus of claim 1, further comprising a selecting section to select the reservation information in the job scheduling screen, wherein
   when the reservation information of the job having the stopping cause is selected by the selecting section in the job scheduling screen, the control section displays the job information relation to the job.

6. The image forming apparatus of claim 1, wherein
   the stopping cause includes a first stopping cause which does not have the tray information matching with tray setting information and paper setting information, the second stopping cause which has the tray information matching with the tray setting information and the paper setting information and in which a remaining amount of paper in the tray is zero and the third stopping cause which has the tray information matching with the tray setting information and the paper setting information and in which the remaining amount of paper in the tray becomes zero while the job is in execution, and
   the control section displays the reservation information relating to the job having the stopping cause in the job scheduling screen in a state corresponding to each stopping cause.

7. The image forming apparatus of claim 1, wherein the control section updates a display position of the reservation information in the job scheduling screen by setting an origin of the second axis as a present point at a predetermined update timing.

8. The image forming apparatus of claim 7, wherein the predetermined update timing is when the image forming process to a predetermined number of sheets of paper is finished or when a predetermined time has passed since a previous update timing.

9. An image forming apparatus, comprising:
   a reservation section to reserve a plurality of jobs;
   an image forming section to execute an image forming process according to the jobs reserved by the reservation section;
   a control section to display a job scheduling screen in a display section, the job scheduling screen having reservation information of each of the job which are reserved displayed in a two dimensional chart in which a first axis indicates tray information or paper information and in which a second axis indicates the number of sheets of paper planned to be used or an estimated execution length of time; and
   an operation section to carry out an execution change operation of a job displayed on the job scheduling screen, wherein
   the control section specifies a tray or a paper to be used in each of the jobs based on a setting condition of each of the jobs which are reserved and displays the reservation information for a value corresponding to the number of sheets of paper planned to be used or an estimated execution length of time of each of the jobs in the second axis at a position on the first axis corresponding to the tray or the paper which is specified, and
   the control section carries out an execution change process corresponding to the execution change operation carried out by the operation section.

10. The image forming apparatus of claim 9, wherein the execution change process of the job includes at least one among a changing of a reserved order of execution of the job, a holding of the job, a deleting of the job and a changing of the setting condition of the job.

11. The image forming apparatus of claim 9, wherein
the operation section comprises an operation button in the job scheduling screen, and
the control section determines whether a job having a stopping cause which stops at least a part of the image forming process is reserved or not based on the setting condition and tray-paper information of each of the jobs which are reserved, and the control section displays job information relating to the job having the stopping cause and carries out the execution change process corresponding to the execution change operation of the operation button when the control section determines that the job having the stopping cause is reserved.

12. The image forming apparatus of claim 11, further comprising a selecting section to select the reservation information in the job scheduling screen, wherein
when reservation information of the job having the stopping cause is selected by the selecting section in the job scheduling screen, the control section displays the job information of the job having the stopping cause.

13. The image forming apparatus of claim 12, wherein the control section displays the operation button in the job scheduling screen when the reservation information of the job having the stopping cause is selected by the selecting section in the job scheduling screen.

14. An image forming apparatus, comprising:
a reservation section to reserve a plurality of jobs;
an image forming section to execute an image forming process according to the jobs reserved by the reservation section;
a plurality of paper feeding trays;
a control section to display a job scheduling screen in a display section, the job scheduling screen having reservation information of each of the jobs which are reserved displayed in a two dimensional chart in which a first axis indicates tray information for each of the paper feeding trays and in which a second axis indicates an estimated execution length of time or the number of sheets of paper planned to be used of a job;
a first operation section to give an instruction to display a setting change screen for changing a setting of the tray information in a state where the job scheduling screen is displayed in the display section; and
a second operation section to give an instruction to change a setting of the tray information in the setting change screen, wherein
the control section specifies a paper feeding tray to be used in each of the jobs based on the setting information of each of the jobs which are reserved, displays the reservation information at a position on the first axis corresponding to the specified paper feeding tray and on the second axis for a value corresponding to the estimated execution length of time or the number of sheets of paper planned to be used of each of the jobs, displays the setting change screen in the display section when the first operation section is operated and carries out a setting change of the tray information when the setting change of the tray information is instructed by the second operation section.

15. The image forming apparatus of claim 14, wherein the tray information includes at least one among a type, a size, a basis weight and a remaining amount of a paper stored in the paper feeding tray.

16. The image forming apparatus of claim 14, wherein
the job scheduling screen comprises a display box to display the reservation information of a job which does not have the tray information matching with the setting information of the job in the first axis, and
the control section displays the reservation information of the job which does not have the tray information matching with the setting information of the job in the display box.

17. The image forming apparatus of claim 14, wherein
when the control section displays the reservation information of the plurality of jobs, the control section displays a relevant reservation information at a position corresponding to the tray information matching with the setting information of each of the jobs in a reserved order of execution of each of the jobs by setting an origin of the second axis as a present point.

18. The image forming apparatus of claim 14, wherein the control section updates a display position of the reservation information in the job scheduling screen by setting an origin of the second axis as a present point at a predetermined update timing.

19. The image forming apparatus of claim 18, wherein
the predetermined update timing is any one of when the setting change of the tray information is carried out, when the image forming process to a predetermined number of sheets of paper is finished and when a predetermined time has passed since a previous update timing.

20. The image forming apparatus of claim 14, further comprises a remaining amount detection section to detect a remaining amount of a paper stored in the tray, wherein
when the remaining amount detected by the remaining amount detection section is less than the number of sheets of paper planned to be used in the job, the control section displays an insufficient amount of paper by displaying a display region for a length corresponding to the insufficient amount of paper by displaying a display region for a length corresponding to the insufficient amount of paper in a second axis direction so as to be different from other display region within a display region of the reservation region in the reservation information of the job in the job scheduling screen.

* * * * *